(12) United States Patent
Gates

(10) Patent No.: US 9,033,074 B1
(45) Date of Patent: May 19, 2015

(54) COUPLER WITH MOVABLE SHAFT

(71) Applicant: Chris Gates, Rowley, IA (US)

(72) Inventor: Chris Gates, Rowley, IA (US)

( * ) Notice: Subject to any disclaimer, the term of this patent is extended or adjusted under 35 U.S.C. 154(b) by 0 days.

(21) Appl. No.: 13/680,479

(22) Filed: Nov. 19, 2012

(51) Int. Cl.
*B60K 17/28* (2006.01)
*A01B 71/06* (2006.01)
*F16D 1/10* (2006.01)
*F16D 1/116* (2006.01)

(52) U.S. Cl.
CPC . *A01B 71/06* (2013.01); *F16D 1/10* (2013.01); *F16D 1/116* (2013.01)

(58) Field of Classification Search
CPC ........ A01B 71/00; A01B 71/02; A01B 71/06; A01B 71/063; F16D 1/10; F16D 1/108; F16D 1/116
USPC .......... 180/14.4, 53.1, 53.3, 53.6; 172/35, 47, 172/272; 464/901
See application file for complete search history.

(56) References Cited

U.S. PATENT DOCUMENTS

| | | | | |
|---|---|---|---|---|
| 2,869,660 A * | 1/1959 | Miller et al. | ................. | 180/14.4 |
| 3,561,789 A * | 2/1971 | Stikeleather et al. | ......... | 172/272 |
| 3,847,415 A * | 11/1974 | Geisthoff | ....................... | 172/272 |
| 4,944,354 A * | 7/1990 | Langen et al. | ................... | 172/47 |
| 5,303,790 A * | 4/1994 | Coleman | ...................... | 180/53.3 |
| 6,827,154 B2 * | 12/2004 | Heller | ........................... | 172/439 |
| 7,278,502 B2 * | 10/2007 | Trefz et al. | .................... | 180/53.1 |
| 7,410,004 B2 * | 8/2008 | Meier | ........................... | 172/450 |
| 7,552,578 B2 * | 6/2009 | Guske | ........................... | 56/15.6 |
| 7,575,077 B2 * | 8/2009 | Priepke et al. | ............... | 180/53.3 |
| 7,641,415 B2 * | 1/2010 | Fox et al. | ................... | 403/322.2 |
| 7,690,439 B2 * | 4/2010 | Priepke et al. | ................... | 172/47 |
| 7,980,338 B2 * | 7/2011 | Steffensen et al. | .......... | 180/53.1 |
| 8,312,947 B2 * | 11/2012 | Goulet et al. | ............... | 180/53.1 |
| 2006/0055140 A1 * | 3/2006 | Trefz et al. | .................... | 280/100 |
| 2007/0177938 A1 * | 8/2007 | Fox et al. | ................... | 403/322.1 |
| 2008/0006014 A1 * | 1/2008 | Guske | ........................... | 56/15.6 |
| 2008/0115983 A1 * | 5/2008 | Priepke et al. | ............... | 180/53.3 |
| 2008/0142231 A1 * | 6/2008 | Priepke et al. | .................... | 172/1 |
| 2011/0290570 A1 * | 12/2011 | Goulet et al. | ............... | 180/53.1 |

* cited by examiner

*Primary Examiner* — Paul N Dickson
*Assistant Examiner* — Timothy Wilhelm
(74) *Attorney, Agent, or Firm* — G. Brian Pingel; Camille L. Urban; David M. Breiner

(57) ABSTRACT

Disclosed is a coupler comprising a first structure, a first shaft rotatably supported by the first structure, a second structure supporting the first structure, and a moving device configured to move the first structure relative to the second structure.

20 Claims, 27 Drawing Sheets

COUPLER WITH MOVABLE SHAFT

BACKGROUND

1. Field

Example embodiments relate to a coupler with a movable shaft. Example embodiments also relate to a system that includes the coupler with the movable shaft.

2. Description of the Related Art

Many conventional tractors include a power takeoff (PTO) arranged near a back thereof. The PTO generally includes a shaft operatively connected the tractor's engine. As the engine runs, the shaft turns. In the conventional art, the PTO is used to power various types of equipment. For example, in the farming industry, PTOs are commonly used to power various types of augers, pumps, shredders, and mowers.

In the conventional art, a universal joint may be used to connect the PTO to a piece of equipment. Connecting the PTO to the piece of equipment may be physically intensive. For example, connecting the PTO to the piece of equipment may require an operator to arrange the tractor near the piece of equipment, climb off of his or her tractor, and manually attach the universal joint to the tractor's PTO shaft and equipment. Such an activity may be physically taxing and time consuming. Furthermore, such an activity may be difficult for a physically handicapped person to perform.

SUMMARY

Example embodiments relate to a coupler with a movable shaft. Example embodiments also relate to a system that includes the coupler.

In accordance with example embodiments, a coupler may include a first structure, a first shaft rotatably supported by the first structure, a second structure supporting the first structure, and a moving device configured to move the first structure relative to the second structure.

In accordance with example embodiments, a system may include a power takeoff, a first structure, a first shaft rotatably supported by the first structure, a second structure supporting the first structure, a connector connecting the power takeoff to the first shaft, and a moving device configured to move the first structure relative to the second structure.

BRIEF DESCRIPTION OF THE DRAWINGS

Example embodiments are described in detail below with reference to the attached drawing figures, wherein.

DETAILED DESCRIPTION

Figure 1A:
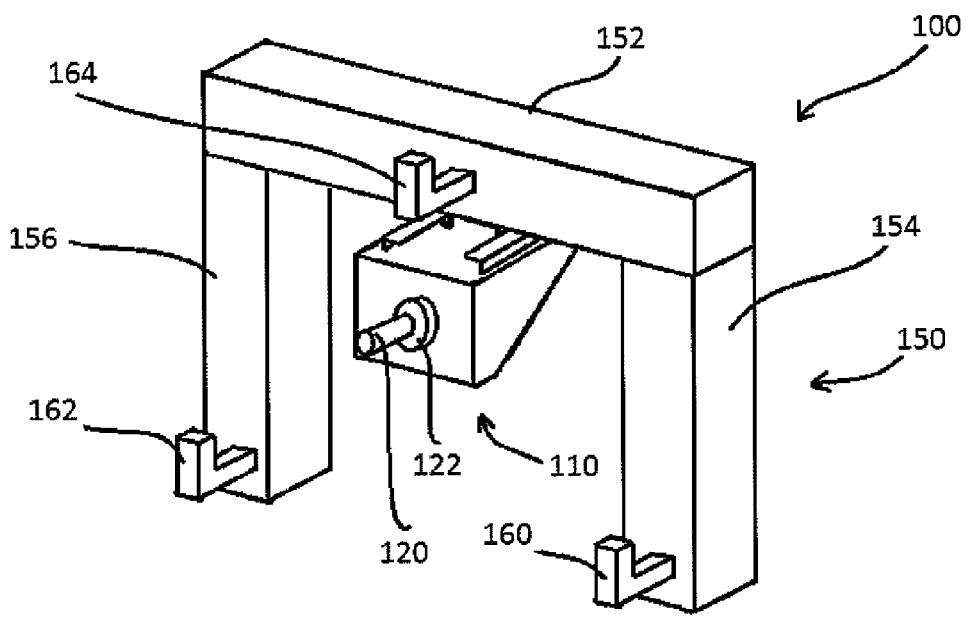
FIG. 1A is a perspective view of a coupler in accordance with example embodiments.

Example embodiments of the invention will now be described with reference to the accompanying drawings. Example embodiments, however, should not be construed as limiting the invention since the invention may be embodied in different forms. Example embodiments illustrated in the figures are provided so that this disclosure will be thorough and complete. In the drawings, the sizes of components may be exaggerated for clarity.

In this Application, when an element is referred to as being "on," "attached to," "connected to," or "coupled to" another element, it can be directly on, attached to, connected to, or coupled to the other element or intervening elements that may be present. On the other hand, when an element is referred to as being "directly on," "directly attached to," "directly connected to," or "directly coupled to" another element, there are no intervening elements present. As used herein, the term "and/or" includes any and all combinations of one or more of the associated listed items.

In this Application, the terms first, second, etc. are used to describe various elements, components, regions, layers, and/or sections. However, these elements, components, regions, layers, and/or sections should not be limited by these terms since these terms are only used to distinguish one element, component, region, layer, and/or section from other elements, components, regions, layers, and/or sections that may be present. For example, a first element, component region, layer or section discussed below could be termed a second element, component, region, layer, or section.

In this Application, spatial terms, such as "beneath," "below," "lower," "over," "above," and "upper" (and the like) are used for ease of description to describe one element or feature's relationship to another element(s) or feature(s). The invention, however, is not intended to be limited by the spatial terms. For example, if an example of the invention illustrated in the figures is turned over, elements described as "over" or "above" other elements or features would then be oriented "under" or "below" the other elements or features. Thus, the spatial term "over" may encompass both an orientation of above and below. The device may be otherwise oriented (rotated 90 degrees or at other orientations) and the spatially relative descriptors used herein interpreted accordingly. The terms "conductive" and "non-conductive" relate to the conduction of electricity (a conductor) or the non conduction of electricity (an insulator).

In this Application, example embodiments may be described by referring to plan views and/or cross-sectional views which may be ideal schematic views. However, it is understood the views may be modified depending on manufacturing technologies and/or tolerances. Accordingly, the invention is not limited by the examples illustrated in the views, but may include modifications in configurations formed on the basis of manufacturing process. Therefore, regions illustrated in the figures are schematic and exemplary and do not limit the invention.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, example embodiments relate to a coupler and a system that uses the coupler.

FIG. 1A is a view of a coupler 100 in accordance with example embodiments. As shown in FIG. 1A, the coupler 100 may be comprised of a first structure 110 supported by a second structure 150. As will be explained shortly, the first structure 110 may be supported in a manner that allows it to move relative to the second structure 150.

In example embodiments, the first structure 110 may resemble an open box. For example, as shown in FIGS. 1A-1D and 6A to 6D, the first structure 110 may be comprised of a front plate 114, a top plate 115, and two side plates 116 and 117. In example embodiments, the front and top plates 114 and 115, for example, may resemble rectangular plates whereas the two side plates 116 and 117 may resemble trapezoidal shaped plates. Example embodiments, however, are not limited by the above shapes as the front, top, and side plates 114, 115, 116, and 117 may have shapes different from those illustrated in the figures. Furthermore, the first structure 110 may include more members than are shown. For example, the first structure may additionally include a back plate and reinforcing plates. In short, the first structure 110 illustrated in the figures is merely exemplary and is not meant to limit example embodiments.

In example embodiments, the first structure 110 may be configured to support a shaft 120. For example, the front plate 114 may include a bearing 122, for example, a ball bearing, which may be configured to support the shaft 120. Thus, the coupler 100 may include a shaft 120 rotatably supported by the first structure 110. In example embodiments, the bearing 122 may prevent the shaft 120 from translating with respect to the first structure 110 and may also prevent the shaft 120 from overturning. However, the bearing 122 may allow the shaft 120 to rotate about its axis line as is well known in the art.

In example embodiments, the first structure 110 may be supported by the second structure 150 in a manner that allows the first structure 110 to move relative to the second structure 150. For example, as shown in at least FIG. 6A, the first structure 110 may include a set of first engaging members 112 which may be configured to engage second set of engaging members 151 on the second structure 150 (see at least FIG. 1B). In example embodiments, each of the first set of engaging members 112 and the second set of engaging members may resemble angle iron. In example embodiments, the first set of engaging members 112 may be attached to the top plate 115 of the first structure 110. As shown in at least FIG. 6B, the first set of engaging members 112 may include flanges 112A which may be configured to engage the second engaging members 151. For example, as described above, the second set of engaging members 151 may also resemble angle iron and thus may have flanges 151A (see at least FIG. 1B) that may engage the flanges 112A of the first set of engaging members 112. By virtue of the engagement of the first and second sets of engaging members 112 and 151, the first structure 120 may be supported by the second structure 150 in a manner that allows the first structure 120 to move with respect to the second structure 150. Furthermore, because the shaft 120 is supported by the first structure 110, the shaft 120 is movable with respect to the second structure 150. As previously mentioned, example embodiments are not meant to be limited by the embodiments illustrated in the drawings. For example, additional components, for example, rollers, may be incorporated in example embodiments to improve certain aspects thereof. For example, rollers may be connected to one of, or both of, the first and second set of engaging members 112 and 151 to reduce friction between the first and second engaging members.

Figure 5:
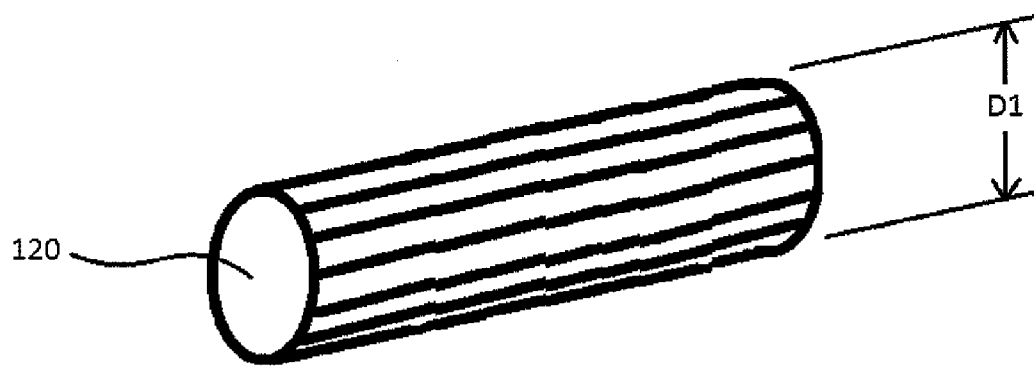
FIG. 5 is a view of the rotating member of the coupler in accordance with example embodiments.
Figure 6A:
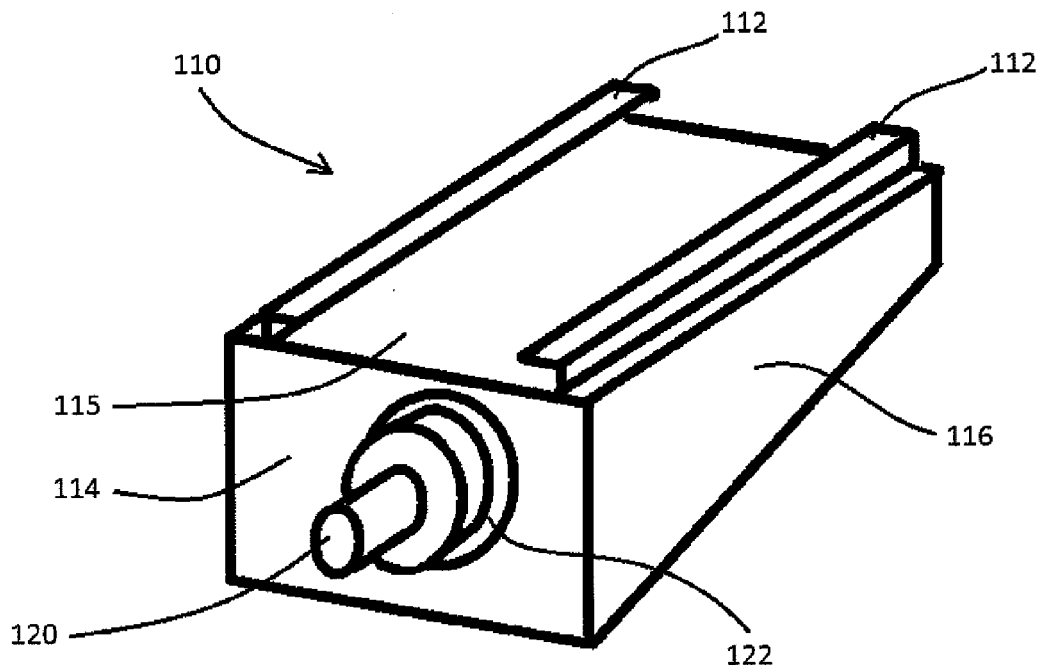
FIG. 6A is a perspective view of a first structure in accordance with example embodiments.
Figure 6B:
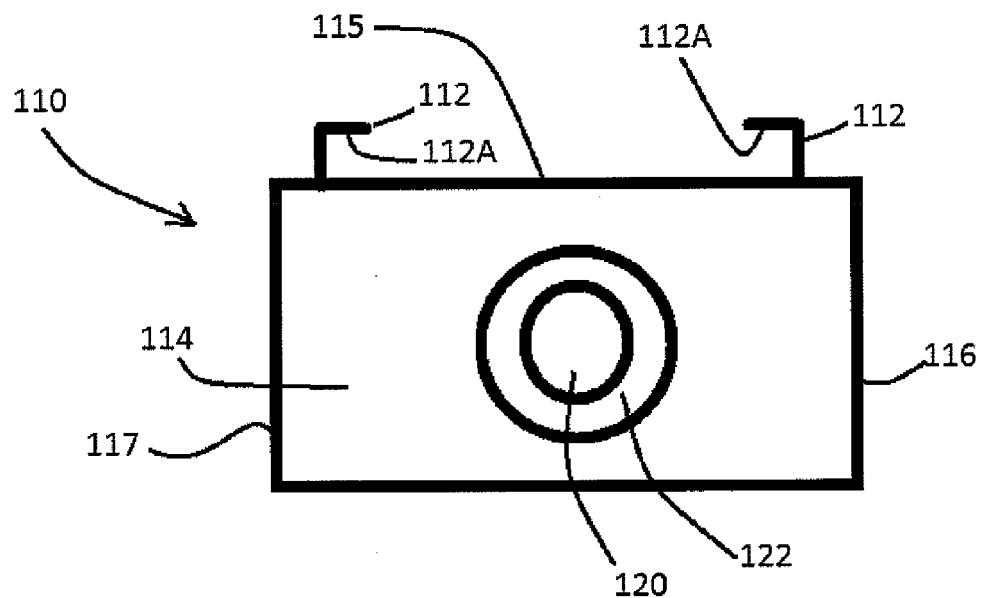
FIG. 6B is a front elevation view of the first structure in accordance with example embodiments.
Figure 6C:
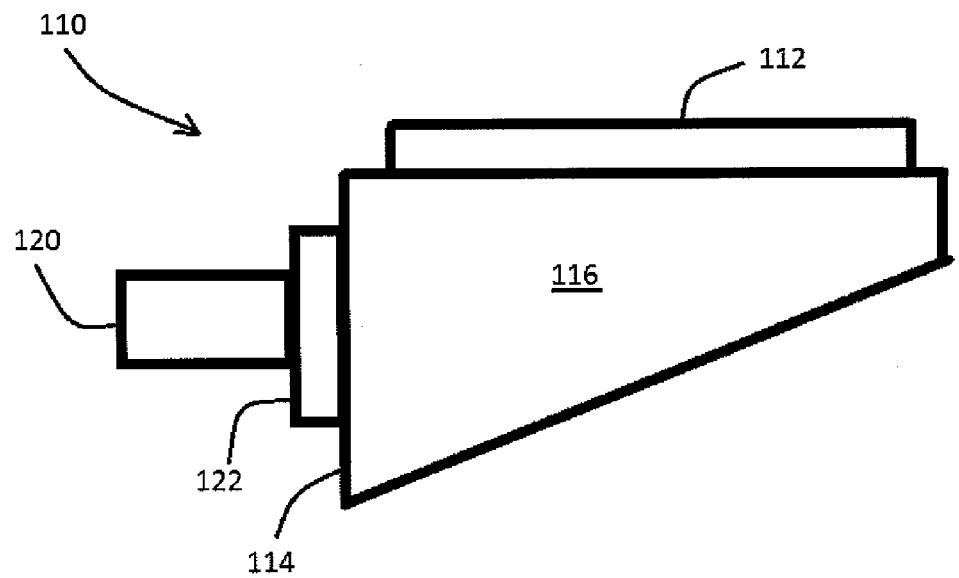
FIG. 6C is a side view of the first structure in accordance with example embodiments.
Figure 6D:
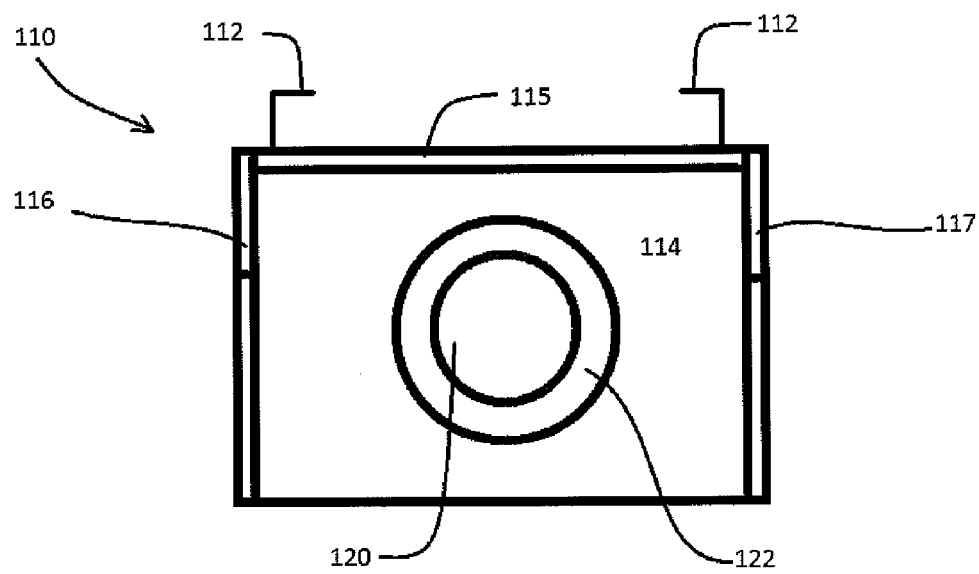
FIG. 6D is a backend elevation view of the first structure in accordance with example embodiments.

In example embodiments, the shaft 120 may be a splined shaft as shown in FIG. 5. In example embodiments, the shaft 120 may resemble a cylinder having a constant diameter D1 as shown in the figures. However, example embodiments are not limited thereto as the shaft 120 may resemble a multidiameter shaft. Furthermore, although the figures illustrate the shaft as having splines extending across its length, the first shaft 120 may, in the alternative, only have splines along a portion of its length.

Referring back to FIGS. 1A-1D, it is shown that the first structure 110 is supported by the second structure 150 in a manner that allows the first structure 110 to move with respect to the second structure 150. For example, as previously explained, the first structure may include the first pair of engaging member 121 (which may resemble angle iron) arranged to engage the second pair of engaging members 151 as shown in at last FIG. 1B. By the engaging members 121 and 151, the first structure 110 may be supported by, yet movable relative to, the second structure 150.

Figure 1B:
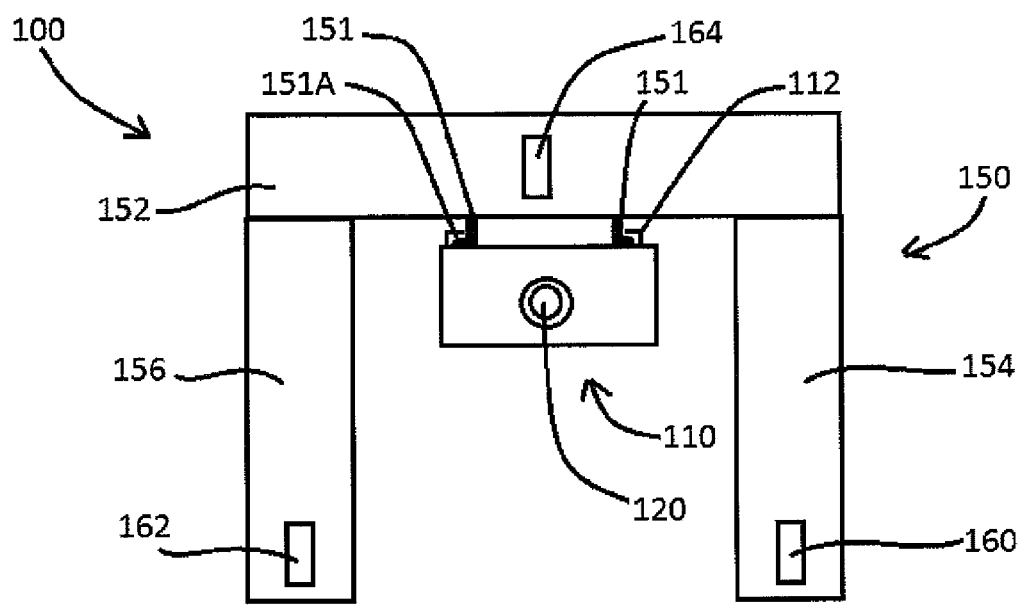
FIG. 1B is a front elevation view of the coupler in accordance with example embodiments.

In example embodiments the second structure 150 may be resemble a frame type structure. For example, the second structure 150 may be comprised of a cross member 152 and two supporting members 154 and 156. As shown in FIG. 1B, the two supporting member 154 and 156 may be attached to the cross member 151 and may be oriented substantially perpendicular to the cross member 152. Example embodiments, however, are not limited by this feature as the supporting member 154 and 156 may be skewed with respect to the cross member 152. As another example, rather than having a relatively straight shape as shown in the figures, the cross member 152 may be arc shaped or have another equivalent shape. Also, as shown in at least FIG. 1B, the second engaging members 151 may be attached to the cross member 152.

In example embodiments, the cross member 152 and the two supporting members 154 and 156 may be comprised of tube steel which are welded together. Example embodiments, however, are not limited thereto as the cross member 152 and the two supporting members 154 and 156 may be formed by a casting process and thus may be formed as one solitary member. In the alternative, a relatively long piece of tube steel may be bent in two places to form the cross member 152 and the two supporting members 154 and 156. Further yet, rather than forming the second structure 150 as a substantially U-shaped member with two ninety degree bends, the second structure 150 may resemble an arc. Thus, the example second structure 150 illustrated in the figures is not meant to be a limiting feature of the invention.

Figure 2A:
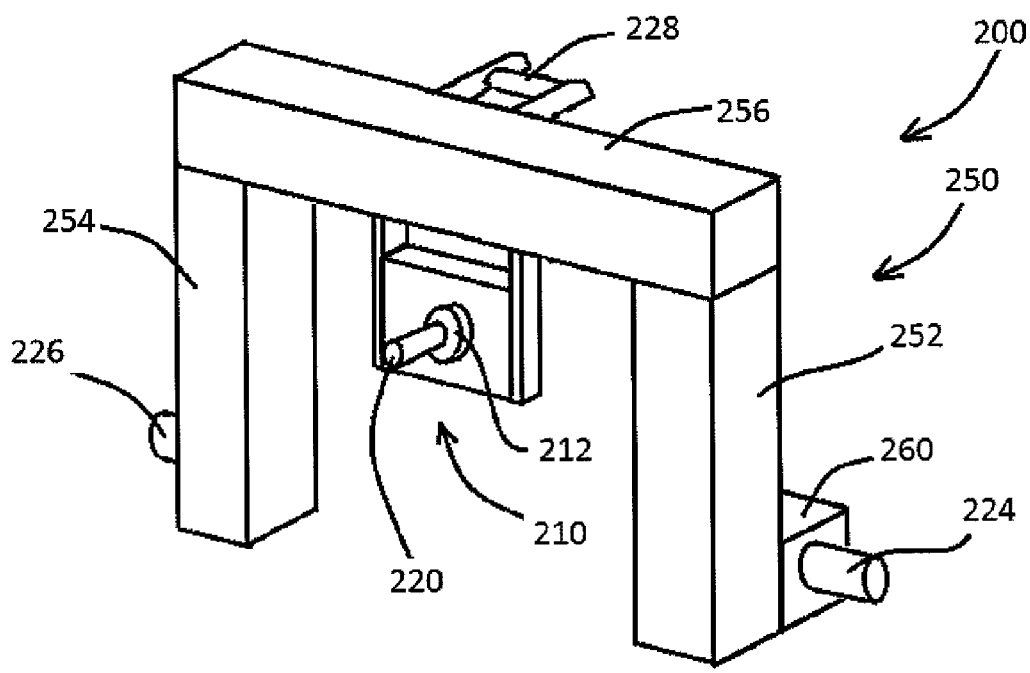
FIG. 2A is a perspective view of an attachment in accordance with example embodiments.
Figure 2B:
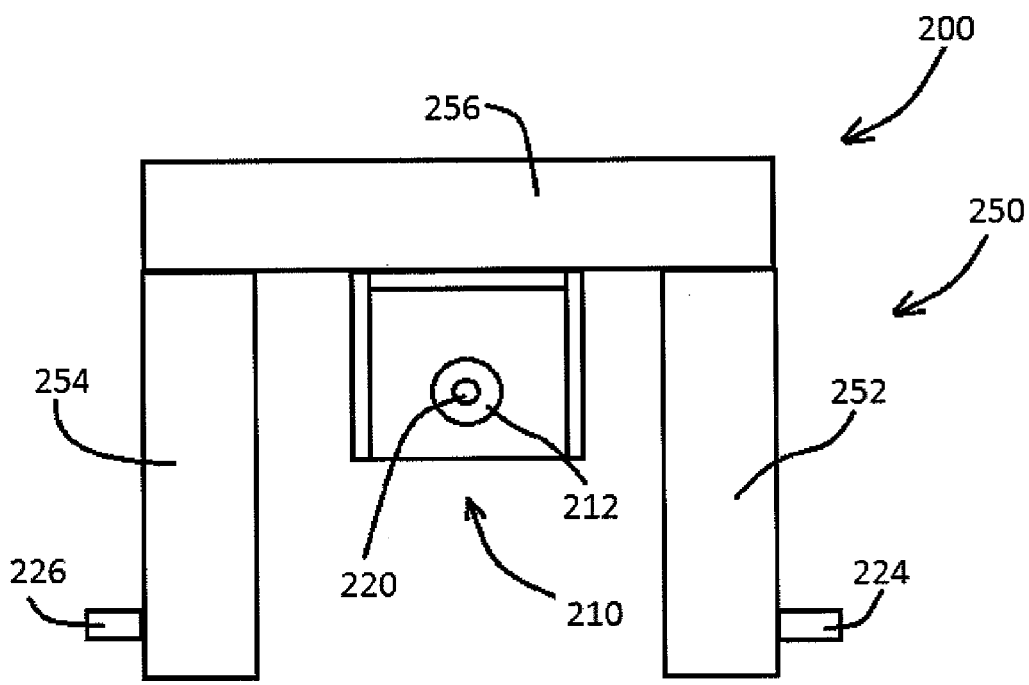
FIG. 2B is a front elevation view of the attachment in accordance with example embodiments.
Figure 2C:
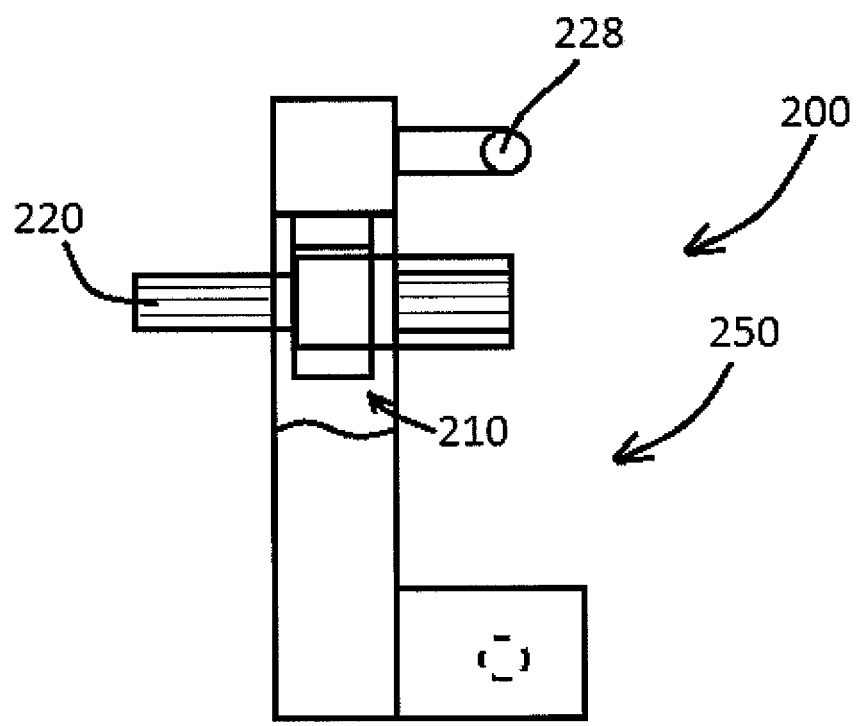
FIG. 2C is a side view of the attachment in accordance with example embodiments, in FIG. 2C, various surfaces of the coupler are removed for clarity.

In example embodiments, the second structure 150 may include a first support member 160, a second support member 162, and a third support member 164. In example embodiments, the first support member 160, the second support member 162, and the third support member 164 may be configured to engage a first complementary support member 224, a second complementary support member 226, and a third complementary support member 228, of an attachment 200, examples of each of the first complementary support member 224, the second complementary support member 226, and the third complementary support member 228 being shown in at least FIG. 2A. In example embodiments, each of the first support member 160, the second support member 162, and the third support member 164 may resemble hook-like structure and each of the first complementary support member 224, the second complementary support member 226, and the third complementary support member 228 may resemble cylinder-type members that may fit into open areas of the first support member 160, the second support member 162, and the third support member 164.

Figure 1C:
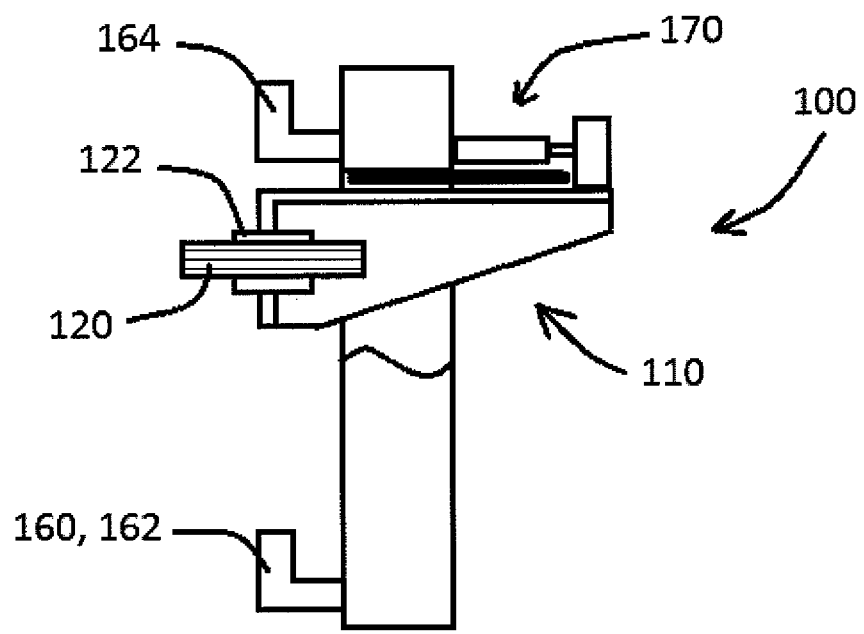
FIG. 1C is a side view of the coupler in accordance with example embodiments, in FIG. 1C, various surfaces of the coupler are removed for clarity.
Figure 1D:
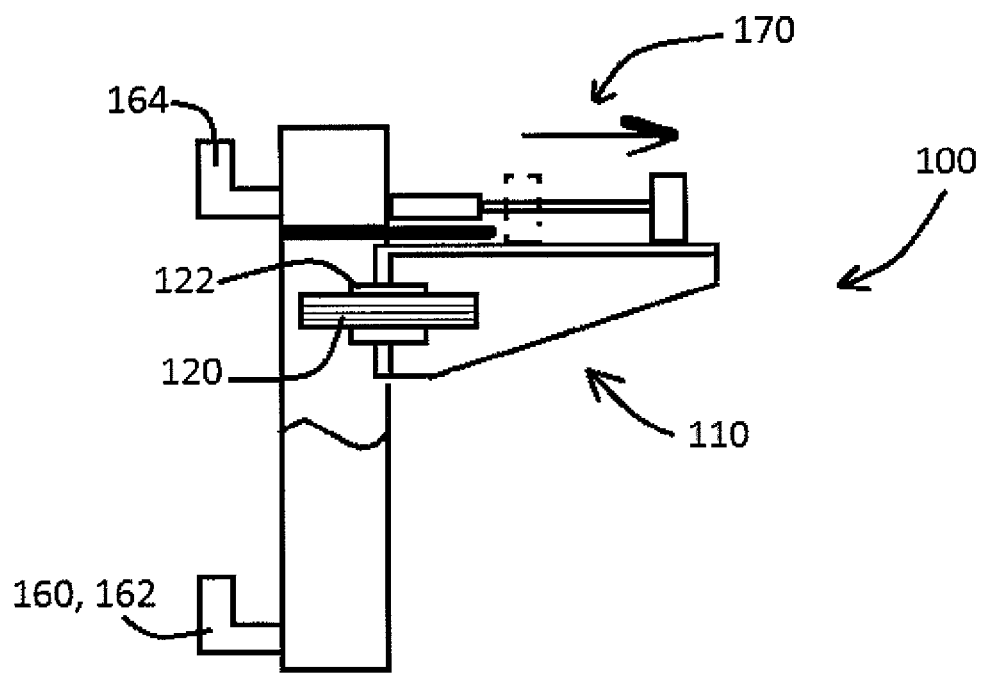
FIG. 1D is a side view of the coupler in accordance with example embodiments, in FIG. 1D, various surfaces of the coupler are removed for clarity.

Referring to FIG. 1C it is seen that the coupler 100 may further include a moving device 170 configured to move the first structure 110 relative to the second structure 150. For example, the moving device 170 may resemble a hydraulic or a pneumatic cylinder having a rod attached to the first structure 110 and a barrel attached to the second structure 150. Thus, as the moving device 170 operates, the first structure 110 may move relative to the second structure 150 as is shown in FIGS. 1C-1D. Example embodiments are not intended to be limited by the aforementioned discussion. For example, in the event the moving device 170 is a pneumatic or hydraulic device, the barrel of the pneumatic or hydraulic device may be attached to the first structure 110 and the rod of the pneumatic or hydraulic device may be attached to the second structure 150. In addition, example embodiments are not limited to a moving device being comprised of a pneumatic or hydraulic cylinder. For example, an electrical device, for example, a motor with a screw type actuator may be used as the moving device 170.

Thus far, example embodiments have described an example of a coupler 100 which includes a first structure 110 supported by a second structure 150 in a manner that allows the first structure 110 to move relative to the second structure 150 via operation of a moving device 170. In example embodiments the moving device 170 may be an actuator, for example, a hydraulic or pneumatic cylinder. In example embodiments the first structure 110 may be configured to rotatably support a shaft 120. For example, the first support 110 may include a bearing 122 attached to a front plate 114 of the first structure 110 and the bearing may support the shaft 120 in a manner that allows the shaft 120 to rotate.

FIGS. 2A-2D are views of an attachment 200 usable with example embodiments. As shown in FIGS. 2A-2D, the attachment 200 may include a third structure 210 configured to rotatably support a second shaft 220. For example, the third structure 210 may include a plate which includes a bearing 212, for example, a ball bearing. The bearing 212 may support the second shaft 220 in a manner that allows the second shaft 220 to rotate with respect to the third structure 210.

Figure 7A:
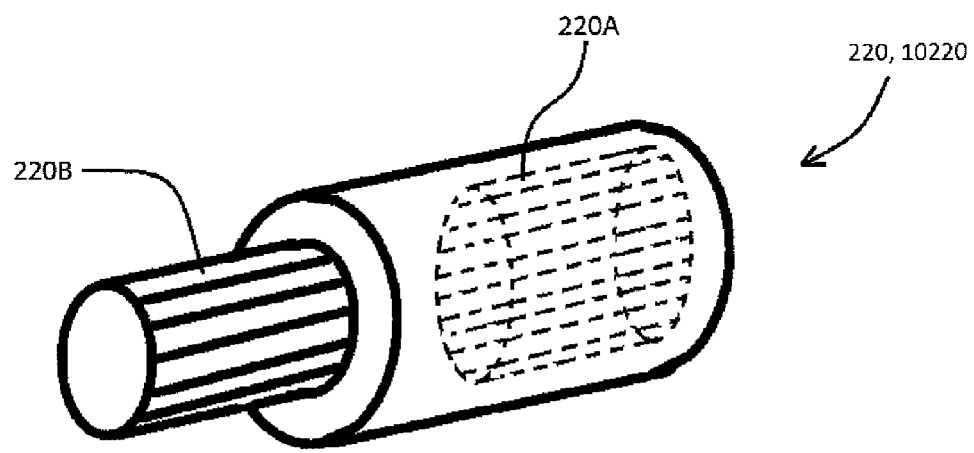
FIG. 7A is a perspective view of a rotating member in accordance with example embodiments.
Figure 7B:
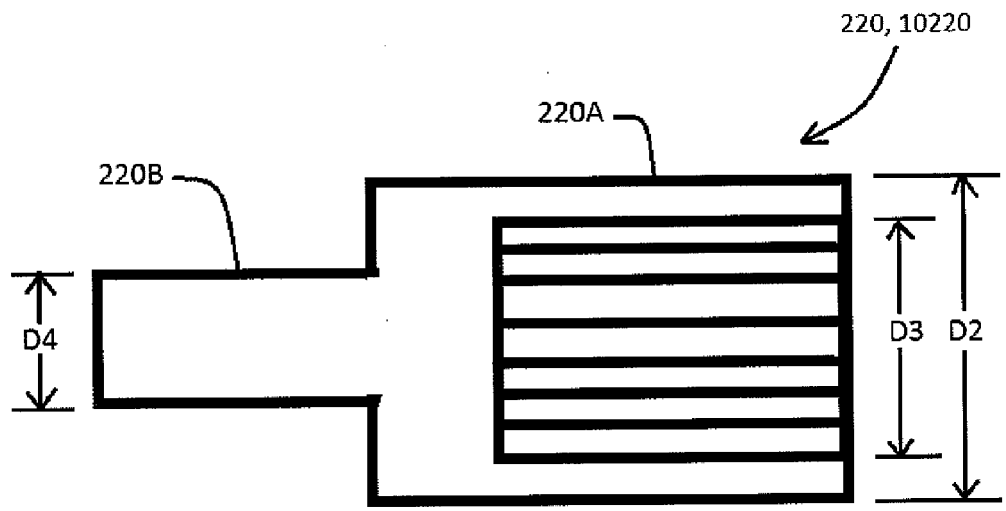
FIG. 7B is a cross-section view of the rotating member in accordance with example embodiments

In example embodiments, the second shaft 220 may be a multidiameter shaft as shown in at least FIGS. 7A and 7B. As shown in FIGS. 7A and 7B, the second shaft 220 may have a first portion 220A and a second portion 220B. The first portion 220A may enclose a space which may be substantially cylindrical. Thus, the first portion 220A may resemble a hollow cylinder or a substantially hollow cylinder. For example, the first portion 220A may resemble a hollow cylinder having an outer diameter D2 and an inner diameter D3. In example embodiments, an internal wall of the first portion 220A forming the space may have grooves configured to engage the splines of the shaft 120. Thus, in example embodiments, the shaft 120 may "plug into" the first portion 220A of the second shaft 120 by inserting the splines of the shaft 120 into the grooves of the first portion 220A. In example embodiments, the second portion 220B of the second shaft 220 may resemble a substantially solid cylinder having an outer diameter D4. In example embodiments, the second portion 220B may have splines similar to the splines of the shaft 120.

In example embodiments, the third structure 210 may be connected to a fourth structure 250. For example, a pair of plates may be used to connect the third structure 210 to the fourth structure 250. Example embodiments, however, are not limited thereto as different structures, for example, tube steel, W-shaped steel members, I-shaped steel members, H-shaped steel members, channel iron or other structural members may be used to attach the third structure 210 to the fourth structure 250.

In example embodiments the fourth structure 250 may be comprised of a cross member 256 and two supporting members 252 and 254. In example embodiments, each of the cross member 256 and the supporting members 252 and 254 may be made from tube steel that are connected by welding. However, example embodiments are not limited thereto. For example, the fourth structure 250 may be formed from a casting process. Thus, each of the cross member 256 and supporting members 252 and 254 may be formed as a single member. In the alternative, a relatively long tube member may be bent into two different places to form the fourth structure 250. Further yet, the fourth structure 250 may be formed of a single member bent into an arc shape. In other words, the particularly disclosed example of the fourth structure 250 is not intended to limit the invention but is merely provided for exemplary purposes.

As was previously described, the attachment 200 may include the first complementary support member 224, the second complementary support member 226, and the third complementary support member 228. In example embodiments, each of the first complementary support member 224 and the second complementary support member 226 may resemble a short cylinder or a bar and each may be configured to insert into an open space provided in the first support member 160 and the second support member 162. The third complementary support member 228 may likewise resemble a short cylinder offset from the fourth structure 250 by a pair of plates. In example embodiments, the third complementary support member 228 may be configured to insert into an open space provided in the third support member 164.

Figure 3A:
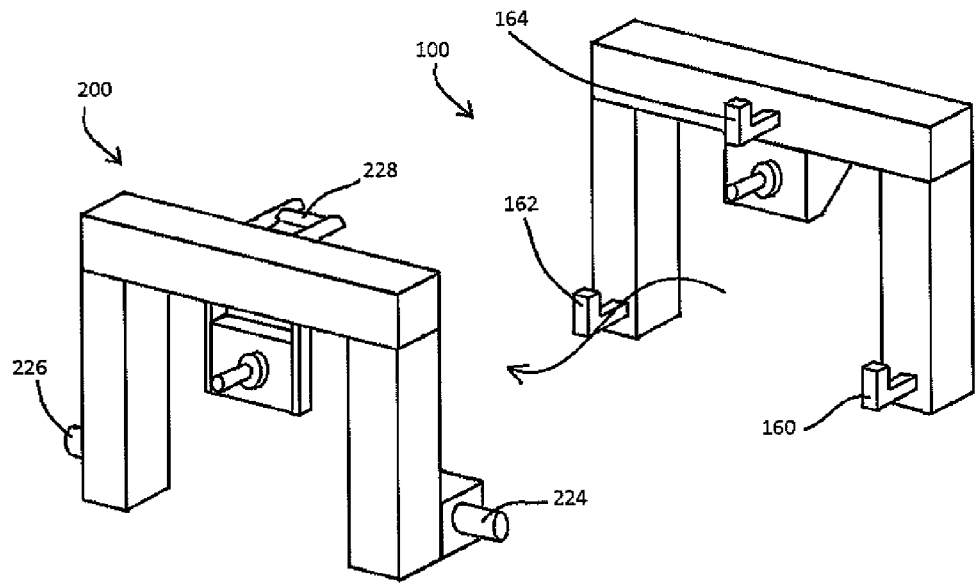
FIG. 3A is a perspective view of the coupler spaced apart from the attachment in accordance with example embodiments.
Figure 3B:
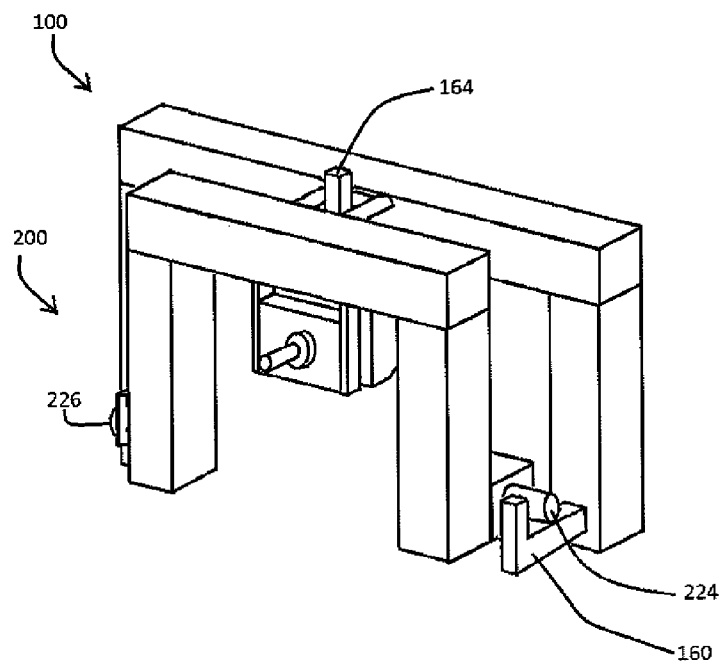
FIG. 3B is a perspective view of the coupler engaged with the attachment in accordance with example embodiments.
Figure 3C:
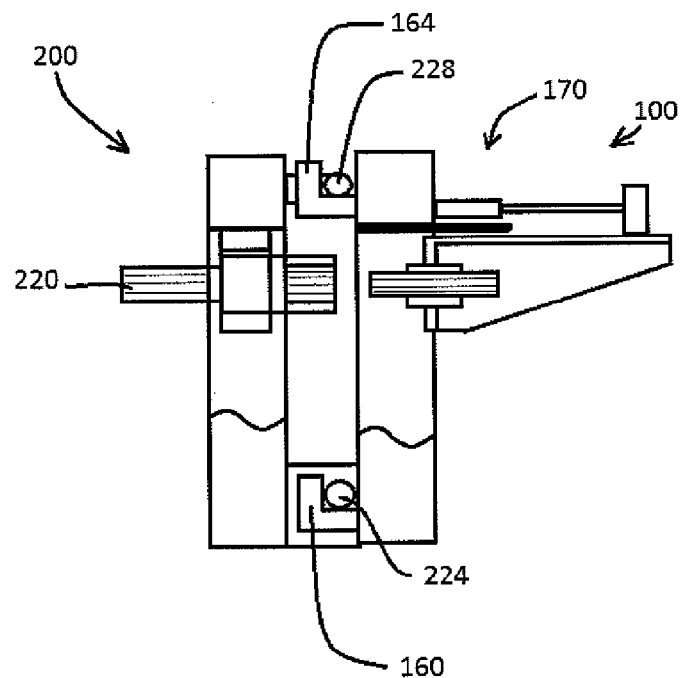
FIG. 3C is a cross-section of the coupler engaged with the attachment in accordance with example embodiments, in FIG. 3C, various surfaces of the coupler are removed for clarity.
Figure 3D:
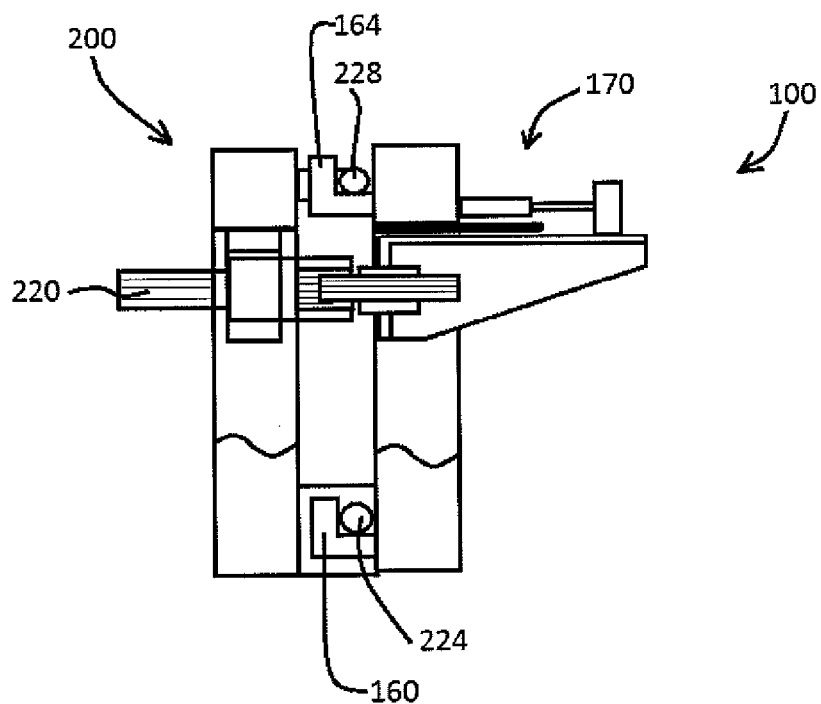
FIG. 3D is a cross-section view of the coupler engaged with the attachment wherein a rotating member of the coupler is engaged with a rotating member of the attachment in accordance with example embodiments, in FIG. 3D, various surfaces of the coupler are removed for clarity.

FIGS. 3A-3D illustrate the coupler 100 attaching to and coupling with the attachment 200. In FIG. 3A, the coupler 100 is shown apart from the attachment 200. In example embodiments, the coupler 100 may be moved so that the first complementary support member 224, the second complementary support member 226, and the third complementary support member 228 reside in the open spaces provided in the first support member 160, the second support member 162, and the third support member 164 as shown in FIGS. 3B-3D. In example embodiments, the coupler 100 and the attachment 200 may be configured so that when the first complementary support member 224, the second complementary support member 226, and the third complementary support member 228 reside in the open spaces provided in the first support member 160, the second support member 162, and the third support member 164, the shaft 120 of the coupler 100 is aligned with the shaft 220 of the attachment 200 as shown in FIG. 3C. In this position, the moving device 170 may be operated to insert the shaft 120 of the coupler 100 into the shaft 220 of the attachment 200 as shown in FIG. 3D. During the attachment operation, the splines of the shaft 120 are inserted into the grooves of the shaft 220. Thus, power may be transferred from the shaft 120 to the shaft 220 by virtue of the spline-groove interface.

FIGS. 4A-4D illustrate an example of the coupler 100 mounted on a vehicle 1000, for example, a tractor or a truck, and the attachment 200 mounted on a piece of equipment 2000, for example, a pump or a mower. In example embodiments, the vehicle 1000 may include a power take off 1100 which is connected to the shaft 120 by a connecting member 1200, for example, a telescoping universal joint. In example embodiments, the connecting member 1200 may transfer power from a shaft of the PTO 1100 to the shaft 120 of the coupler 100. For example, as a shaft of the power take off 1100 turns, the connecting member 1200 may turn causing the shaft 120 to turn. In this manner the shaft 120 is operatively connected to the power take off 1100.

In example embodiments, a second moving device 500 may be attached to the vehicle 1000 and to the coupler 100 to move the coupler 100 up and down. In example embodiments, the second moving device 500 may be an actuator, for example, a hydraulic or pneumatic cylinder or a screw jack connected to an electric motor.

Figure 4A:
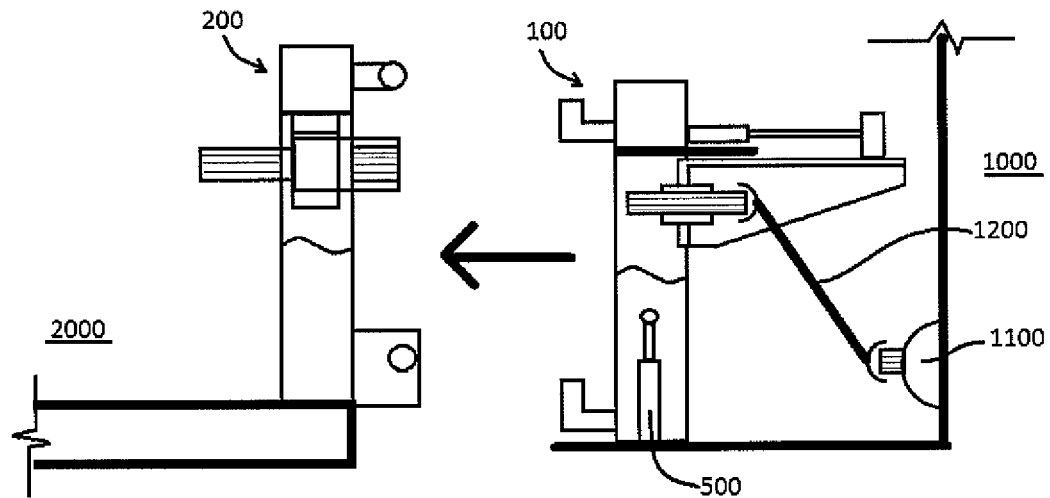
FIG. 4A is a view of the coupler mounted on a vehicle and the attachment mounted on a piece of equipment in accordance with example embodiments, in FIG. 4A, various surfaces of the coupler and the attachment are removed for clarity.
Figure 4B:
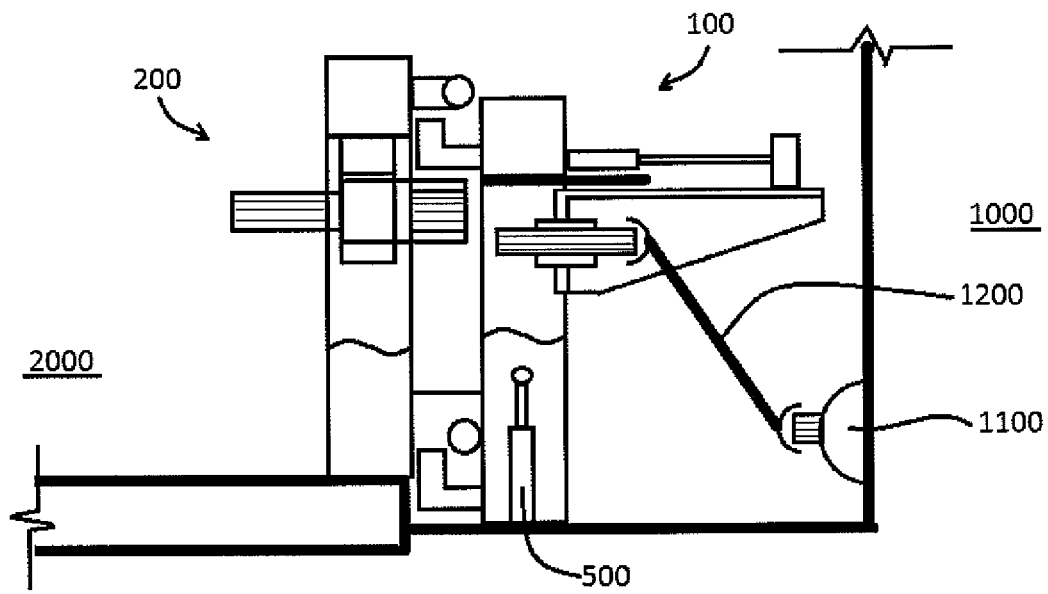
FIG. 4B is a view of the coupler mounted on the vehicle and the attachment mounted on the piece of equipment in accordance with example embodiments, wherein the coupler is about to engage the attachment, in FIG. 4B, various surfaces of the coupler and the attachment are removed for clarity.
Figure 4C:
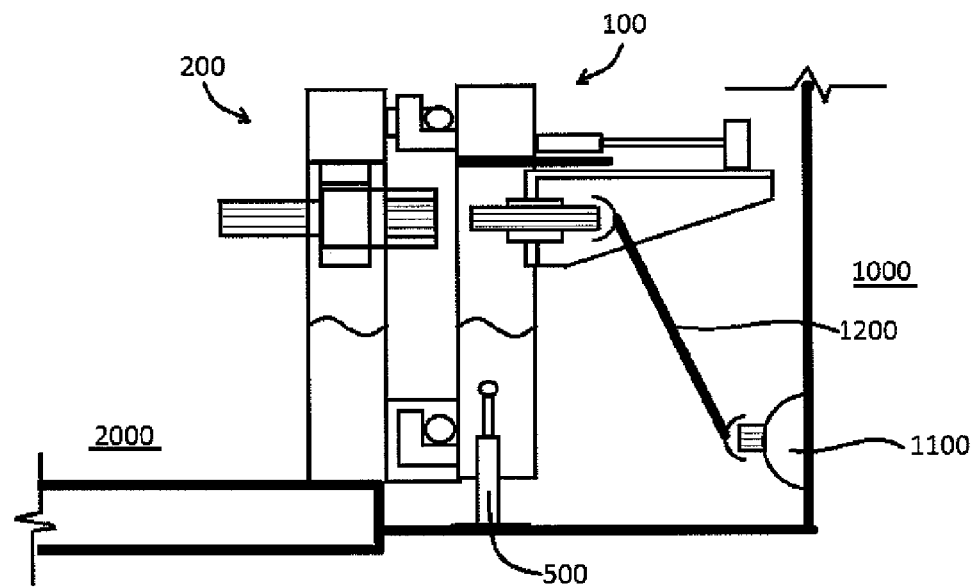
FIG. 4C is a view of the coupler mounted on the vehicle and the attachment mounted on the piece of equipment in accordance with example embodiments, wherein the coupler is engaged with the attachment, in FIG. 4C, various surfaces of the coupler and the attachment are removed for clarity.
Figure 4D:
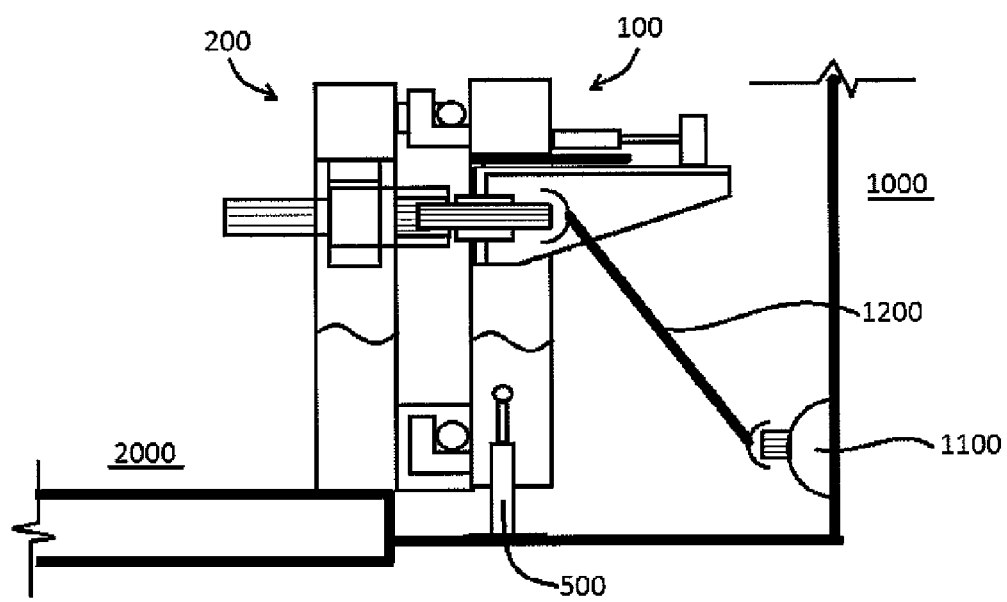
FIG. 4D is a view of the coupler mounted on the vehicle and the attachment mounted on the piece of equipment in accordance with example embodiments, wherein the coupler is engaged with the attachment and a rotating member of the coupler is engaged with a rotating member of the attachment, in FIG. 4D, various surfaces of the coupler and the attachment are removed for clarity.

In FIG. 4A the coupler 100 is shown in a first position where the first, second, and third support members 160, 162, and 164 are at a lower elevation than that of the first, second, and third complementary support members 224, 226, and 228. In example embodiments, the vehicle 1000 may be moved so that the first, second, and third support members 160, 162, and 164 are below the first, second, and third complementary support members 224, 226, and 228 as shown in FIG. 4B. In this position, the second moving device 500 may be activated to move the coupler 100 upwards so that the first, second, and third complementary support members 224, 226, and 228 are in the open spaces formed in the first, second, and third support members 160, 162, and 164 as shown in FIG. 4C. In this configuration the shaft 120 of the coupler 100 may be aligned with the shaft 220 of the attachment 200. In example embodiments, because the shaft 120 of the coupler 100 and the shaft 220 of the attachment 200 may be aligned, the moving device 170 may be operated to insert the shaft 120 into the shaft 220 so that the splines associated with shaft 120 are inserted into the grooves of the shaft 220 as shown in FIG. 4D. Because the shaft 120 is inserted into the shaft 220, the shaft 220 will turn as the shaft 120 turns. Thus, because the shaft 120 is operatively connected to the power take off 1100, and because the shaft 120 is inserted into the shaft 220, the shaft 220 will turn as the shaft of the power take off 1100 turns.

Figure 8A:
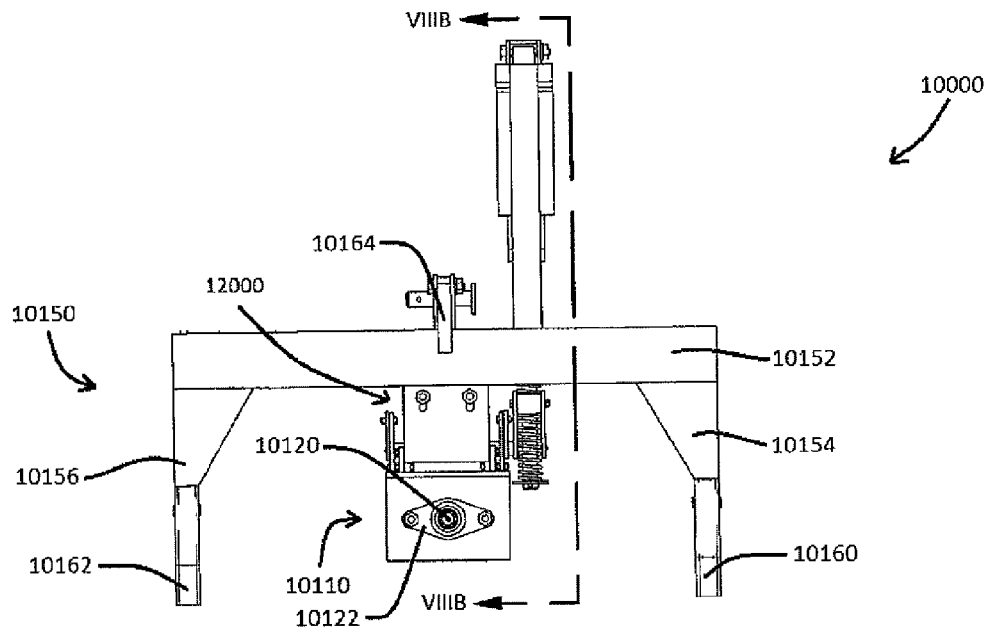
FIG. 8A is a front elevation view of a coupler in accordance with example embodiments.
Figure 8B:
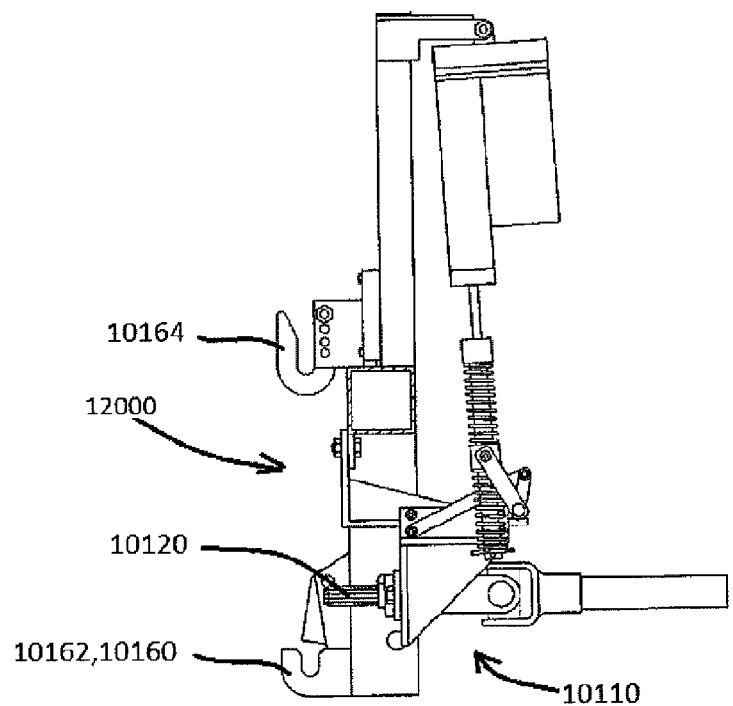
FIG. 8B is a side cross-section view of the coupler in accordance with example embodiments.

FIG. 8A is a view of another coupler 10000 in accordance with example embodiments. As shown in FIG. 8A, the coupler 10000 may be comprised of a first structure 10110 supported by a second structure 10150. As will be explained shortly, the first structure 10110 may be supported in a manner that allows it to move relative to the second structure 10150.

Figure 10A:
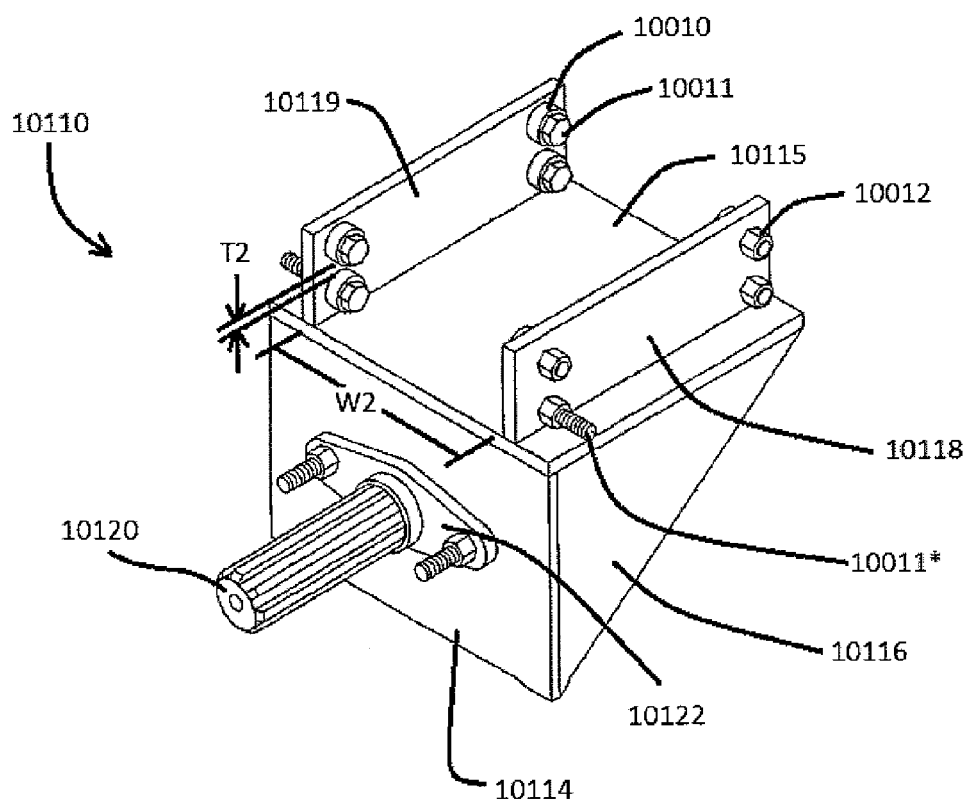
FIG. 10A is a view of a first structure in accordance with example embodiments.
Figure 10B:
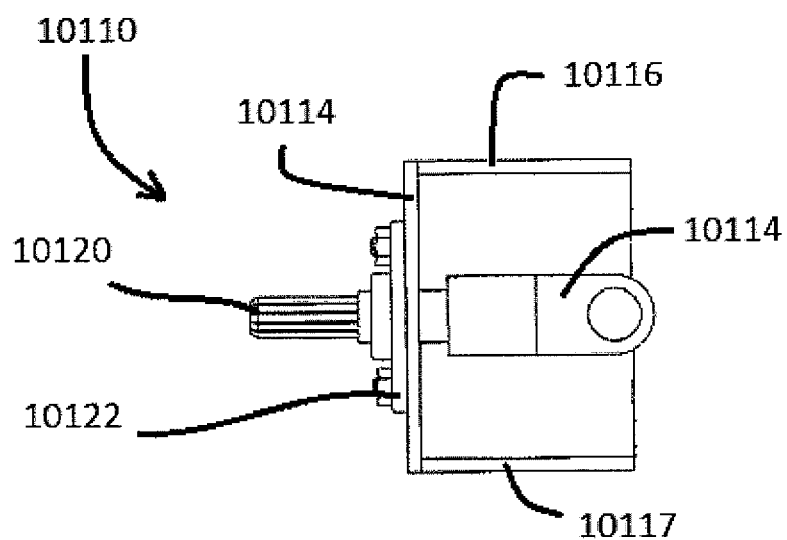
FIG. 10B is a view of the first structure in accordance with example embodiments.

In example embodiments, the first structure 10110 may resemble an open box. For example, as shown in FIGS. 10A and 10B, the first structure 10110 may be comprised of a front plate 10114, a top plate 10115, and two side plates 10116 and 10117. In example embodiments, the front and top plates 10114 and 10115, for example, may resemble rectangular plates whereas the two side plates 10116 and 10117 may resemble triangular shaped plates. Example embodiments, however, are not limited by the above shapes as the front, top, and side plates 10114, 10115, 10116, and 10117 may have shapes different from those illustrated in the figures. Furthermore, the first structure 10110 may include more members than are shown. For example, the first structure 10110 may additionally include a back plate and reinforcing plates. In short, the first structure 10110 illustrated in the figures is merely exemplary and is not meant to limit example embodiments.

As shown in at least FIG. 10A, the first structure 10110 may additionally include two plates 10118 and 10119 attached to the top plate 10115. In example embodiments the two plates 10118 and 10119 may be include holes through which various bolts 10011 may pass. For example, in FIG. 10A it is understood that each of the two plates 10118 and 10119 include four holes through which four bolts 10011 pass. In example embodiments, rollers 10010 are secured to the first structure 10110 by the bolts 10011. As shown in FIG. 10A, the first structure 10110 may include a total of eight rollers 10010 supported by eight bolts 10011, however this is not intended to be a limiting feature of the invention since the invention may include more or less than eight rollers supported by more or less than eight bolts. In example embodiments nuts 10012 may be provided to secure the bolts 10011 in place as is shown in the figures. In example embodiments, the plates 10118 and 10119 may be substantially parallel and may be spaced apart by a distance W2. Furthermore, the rollers may have a vertical spacing of T2.

In example embodiments, the first structure 10110 may be configured to support a shaft 10120. For example, the front plate 10114 may include a bearing 10122, for example, a ball bearing, which may be configured to support the shaft 10120. Thus, the coupler 10000 may include a shaft 10120 rotatably supported by the first structure 10110. In example embodiments, the bearing 10122 may prevent the shaft 10120 from translating with respect to the first structure 10110 and may also prevent the shaft 10120 from overturning. However, the bearing 10122 may allow the shaft 10120 to rotate about its axis line as is well known in the art. As will be explained shortly, the rollers 10010 may engage a plate 12200 of an intermediate support structure. Thus, the rollers 10010 may be considered engaging members.

Figure 9A:
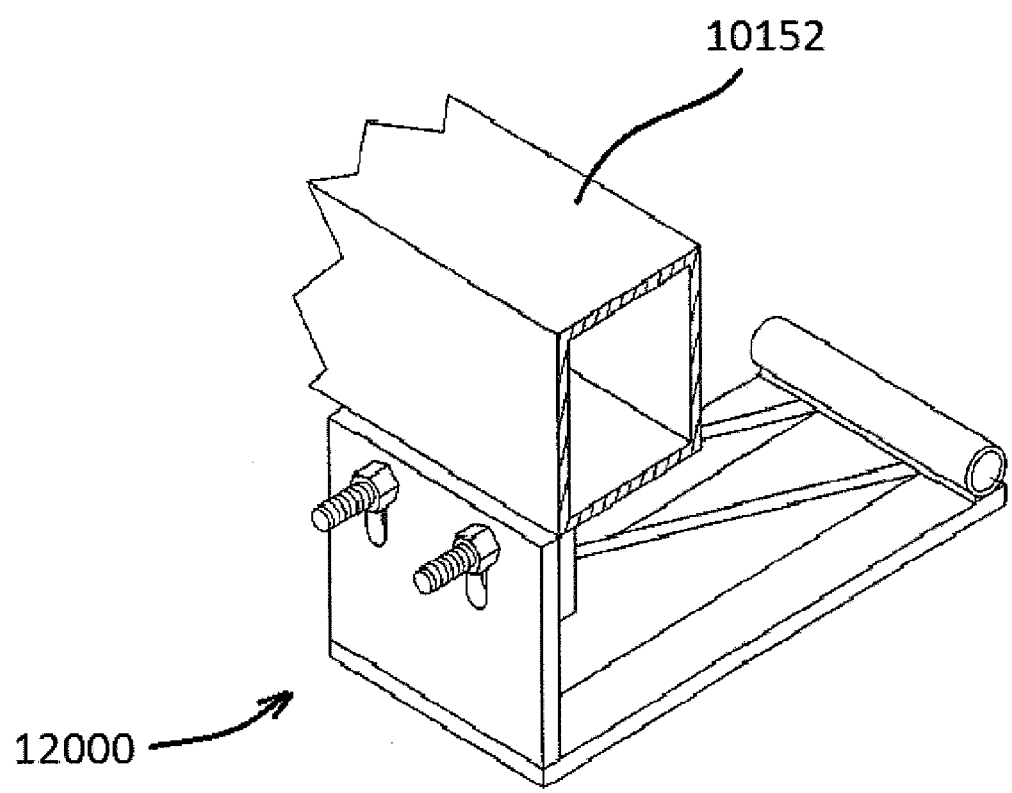
FIG. 9A is a close-up view of an intermediate support structure in accordance with example embodiments.
Figure 9B:
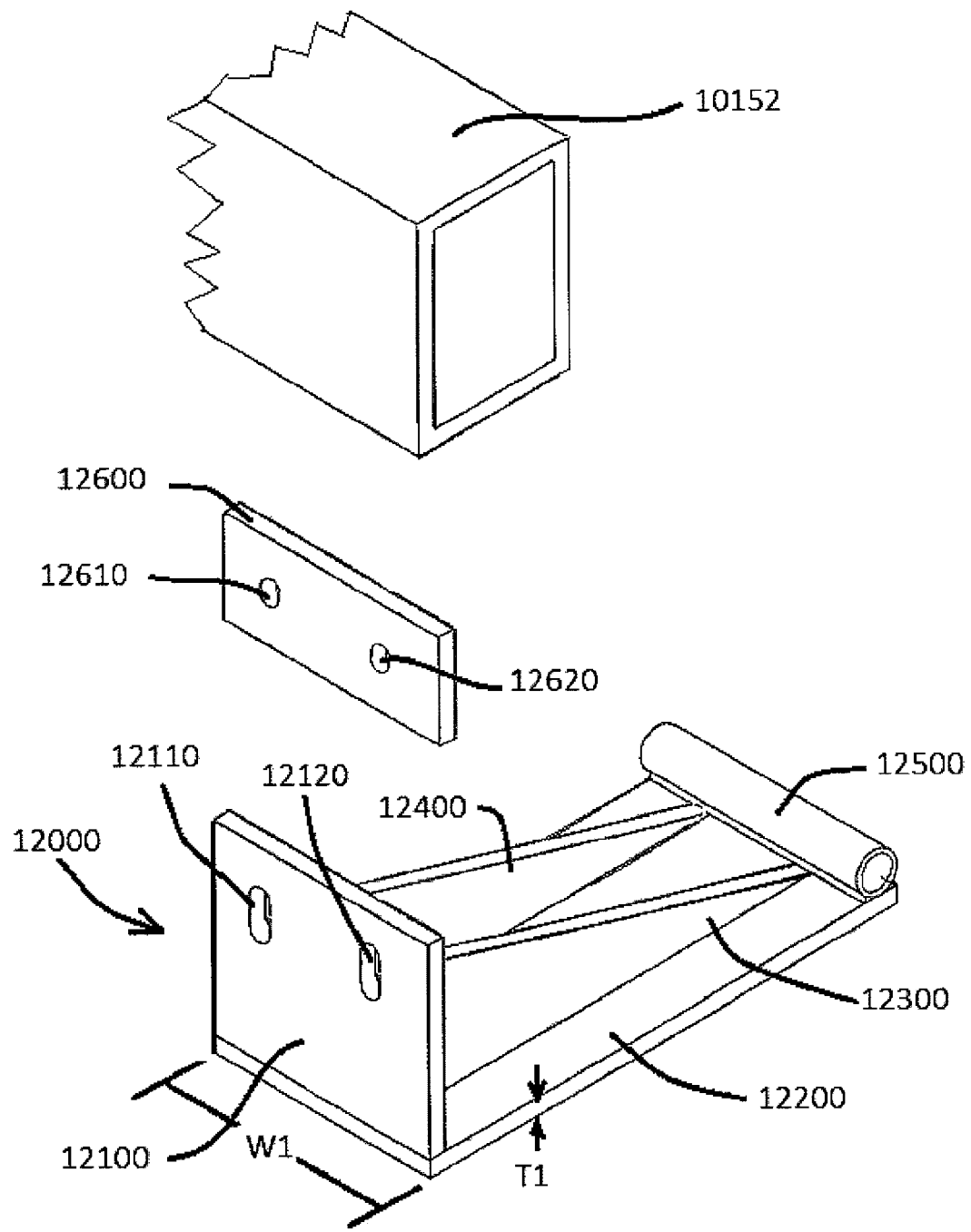
FIG. 9B is an exploded view of the coupler in accordance with example embodiments.

In example embodiments, the first structure 110 may be supported by the second structure 10150 in a manner that allows the first structure 10110 to move relative to the second structure 10150. For example, as shown in at least FIG. 8A, the first structure 10110 may be supported by an intermediate support structure 12000. As shown in at least FIG. 9B, the intermediate support structure 12000 may be comprised of a first plate 12100, a second plate 12200, a third plate 12300, a fourth plate 12400, and a capture member 12500 which may resemble a circular tube.

In example embodiments, the intermediate support structure 12000 may be connected to a cross member 10152 (to be explained later) via a connecting plate 12600. For example, the connecting plate 12600 may be welded to a bottom surface of the cross member 10152 and the intermediate support structure 12000 may be bolted to the connecting plate 12600. For example the connecting plate 12600 may include a first hole 12610 and a second hole 12620 and the first plate 12100 may include a third hole 12110 and a fourth hole 12120. In example embodiments, the first and second holes 12610 and 12620 may be aligned with the third and fourth holes 12110 and 12120 and bolts may be passed through the aligned holes to attach the intermediate support structure 12000 to the connecting plate 12600. Example embodiments, however, are not limited by the above connection method. For example, rather than bolting the intermediate support structure 12000 to the connection plate 12600, the intermediate support structure 12000 may be welded or riveted to the connecting plate 12600. Further yet, the connecting plate 12600 may be omitted and the intermediate support structure 12000 may be welded directly to the cross member 10152.

In example embodiments, the second plate 1220 may act as a base plate and the third and fourth plates 12300 and 12400 may act as stiffener plates. In example embodiments, a width W1 of the second plate 12200 may about the same as, or slightly smaller than, the width W2 separating the fifth and sixth plates 10118 and 10119 of the first structure 10110. Furthermore, a thickness T1 of the second plate 12200 may be about the same as, or slightly smaller than, the distance T2 that vertically separates the rollers 10010 attached to the fifth and sixth plates 10118 and 10119.

Figure 11A:
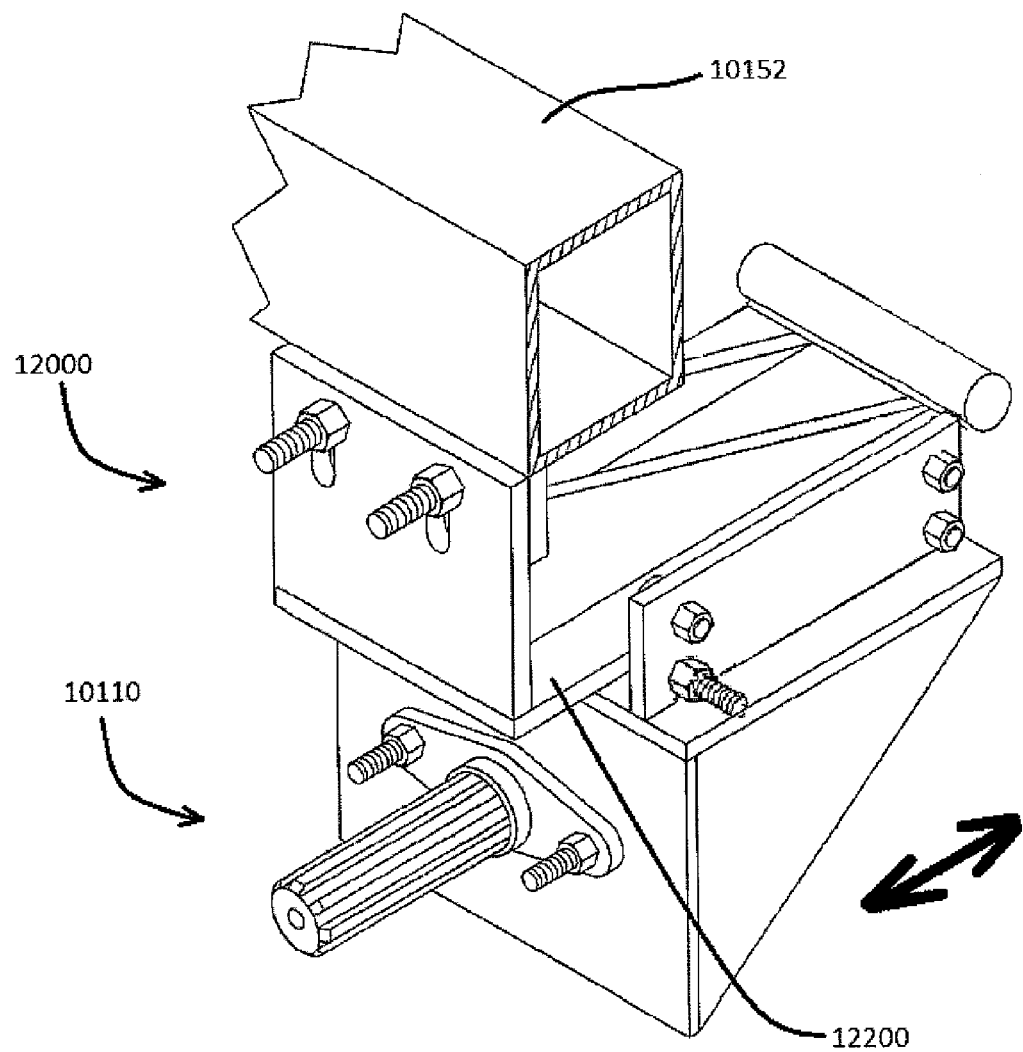
FIGS. 11A and 11B are views of the first structure being supported by the intermediate support structure in accordance with example embodiments.
Figure 11B:
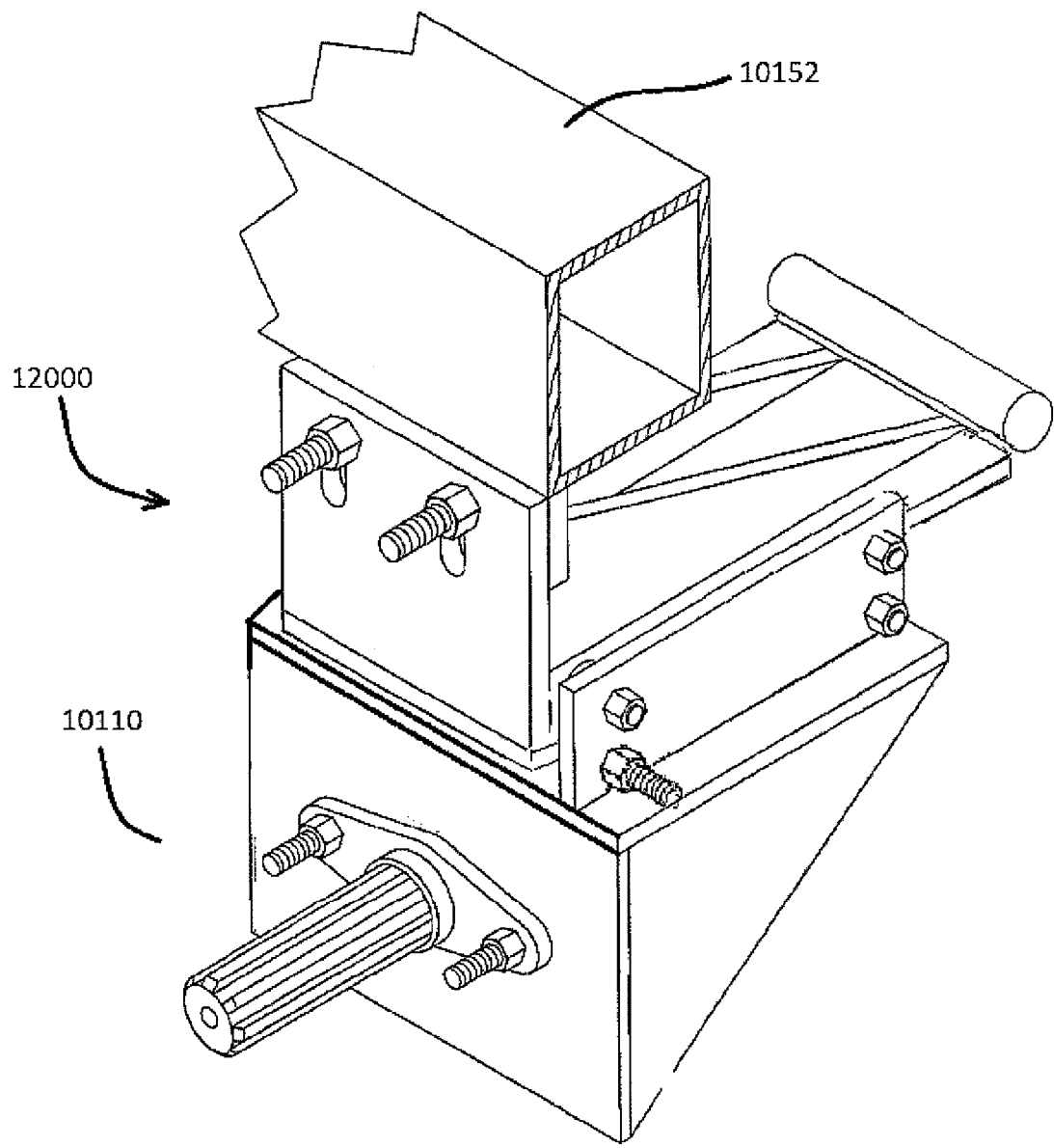

FIG. 11A illustrates the first structure 10110 engaged with the intermediate support structure 12000. As shown in FIG. 11A, the second plate 12200 of the support structure 12000 is sandwiched between a plurality of rollers 10010 that are attached to the fifth and sixth plates 10118 and 10119 of the first structure 10110. In example embodiments, the second plate 12200 prevents the first structure 10100 from moving laterally or vertically, however, the rollers 10010 allow the first structure 10110 to move along the plate 12200 in a first direction. Thus, the first structure 10110 is free to move in a linear fashion with respect to the intermediate support structure 12000 and therefore the second structure 10150. In example embodiments FIG. 11A illustrates and example of the first structure 10110 in a first position and FIG. 11B illustrates the first structure 10110 in a second position.

In example embodiments, the shaft 10120 may be a splined shaft as shown in FIG. 10A. In example embodiments, the shaft 10120 may resemble a cylinder having a constant diameter as shown in the figures. However, example embodiments are not limited thereto as the shaft 10120 may resemble a multidiameter shaft. Furthermore, in example embodiments, the splines may extend across a length of the shaft 10120 or, alternatively, along a portion of its length.

In example embodiments the second structure 10150 may be resemble a frame type structure. For example, the second structure 10150 may be comprised of the cross member 10152 and two supporting members 10154 and 10156. As shown in FIG. 8A, the two supporting member 10154 and 10156 may be attached to the cross member 10151 and may be oriented substantially perpendicular to the cross member 10152. Example embodiments, however, are not limited by this feature as the supporting member 10154 and 10156 may be skewed with respect to the cross member 10152. As another example, rather than having a relatively straight shape as shown in the figures, the cross member 10152 may be arc shaped or have another equivalent shape.

In example embodiments, the cross member 10152 and the two supporting members 10154 and 10156 may be comprised of tube steel and plates which may be welded together. Example embodiments, however, are not limited thereto as the cross member 10152 and the two supporting members 10154 and 10156 may be formed by a casting process and thus may be formed as one solitary member. In the alternative, a relatively long piece of tube steel may be bent in two places to form the cross member 10152 and the two supporting members 10154 and 10156 rather than using plates to form the two supporting members 10154 and 10156. Further yet, rather than forming the second structure 10150 as a substantially U-shaped member with two ninety degree bends, the second structure 10150 may resemble an arc. Thus, the example second structure 10150 illustrated in the figures is not meant to be a limiting feature of the invention.

In example embodiments, the second structure 10150 may include a first support member 10160, a second support member 10162, and a third support member 10164. In example embodiments, the first support member 10160, the second support member 10162, and the third support member 10164 may be configured to engage a first complementary support member 10224, a second complementary support member 10226, and a third complementary support member 10228, of an attachment 10200, examples of each of the first complementary support member 10224, the second complementary support member 10226, and the third complementary support member 10228 being shown in at least FIGS. 15A and 15B. In example embodiments, each of the first support member 10160, the second support member 10162, and the third support member 10164 may resemble hook-like structures and each of the first complementary support member 10224, the second complementary support member 10226, and the third complementary support member 10228 may resemble cylinder-type members that may fit into open areas of the first support member 10160, the second support member 10162, and the third support member 10164.

Figure 14A:
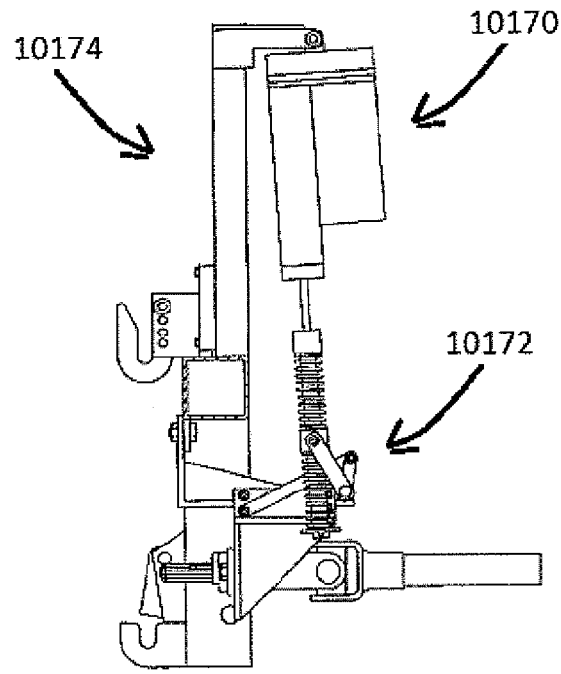
FIGS. 14A and 14B are side views of the coupler in accordance with example embodiments.
Figure 14B:
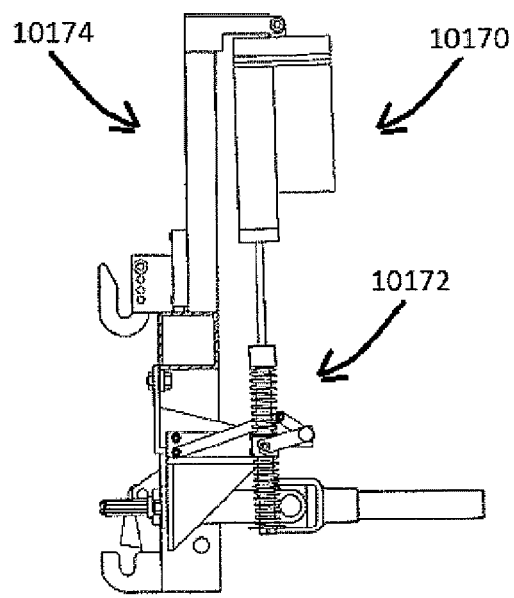

Referring to FIG. 14A it is seen that the coupler 10000 may further include a moving device 10170 configured to move the first structure 10110 relative to the second structure 10150. For example, the moving device 10170 may resemble a hydraulic or a pneumatic cylinder having a rod attached to the first structure 10110 and a barrel attached to the second structure 10150 via an intermediary connecting member 10174 which may be a structure formed from tube. Thus, as the moving device 10170 operates, the first structure 10110 may move relative to the second structure 10150 as is shown in FIGS. 14A-14B. Example embodiments are not intended to be limited by the aforementioned discussion. For example, in the event the moving device 10170 is a pneumatic or hydraulic device, the barrel of the pneumatic or hydraulic device may be attached to the first structure 10110 and the rod of the pneumatic or hydraulic device may be attached to the second structure 10150. In addition, example embodiments are not limited to a moving device being comprised of a pneumatic or hydraulic cylinder. For example, an electrical device, for example, a motor with a screw type actuator may be used as the moving device 10170.

Figure 12:
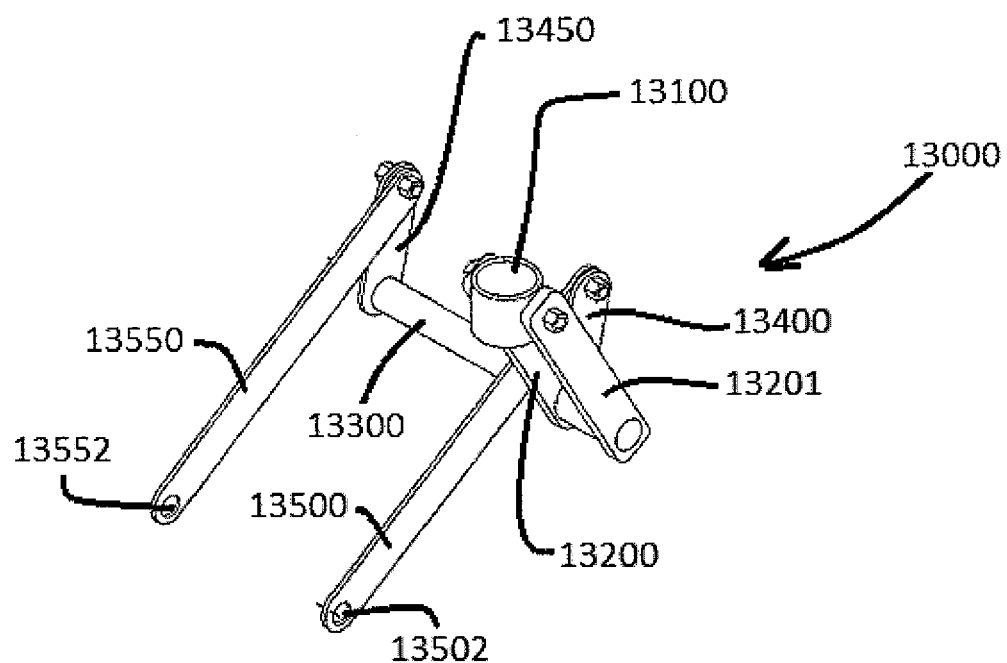
FIG. 12 is a view of a linkage in accordance with example embodiments.

In example embodiments, the moving device 10170 may be connected to the first structure 10110 by a linkage 13000, an example of which is illustrated in at least FIG. 12. In example embodiments the linkage 13000 may include a collar 13100 which may be configured to attach to the moving device 10170. For example, the collar 13100 may attach to a rod 10172 of the moving device 10170 in the event the moving device 10170 is one of a pneumatic or hydraulic cylinder. In example embodiments, the linkage may further include a first link 13200 and a second link 13201 which are pivotally connected to the collar 13100. In example embodiments, each of the first and second links 13200 and 13201 may be rigidly connected to an axle 13300 which may resemble a cylinder. In example embodiments, the axle 13300 may be at least partially enclosed by the capture member 12500 of the intermediate support structure 12000. Thus, while the axle 13300 may rotate within the capture member 12500, the capture member 12500 may prevent the axle 13300 from translating in at least one direction. In example embodiments, the linkage 13000 may further include a third link 13400 rigidly connected to the axle 13300 and a fourth link 13500 pivotally connected to the third link 13300. In example embodiments, the fourth link 13500 may include a hole 13502 at one end through which a bolt 10011* may pass. Thus, the fourth link 13500 may connect the linkage 13000 to the first structure 10110. In example embodiments, the linkage may include a fifth link 13450 rigidly attached to the axle 13300 and a sixth link 13550 pivotally connected to the fifth link 13450. The fifth link 13450 may include a hole 13552 through which another bolt 10011* may pass. Thus, the sixth link 13550 may also connect the linkage 13000 to the first structure 10110.

Figure 13A:
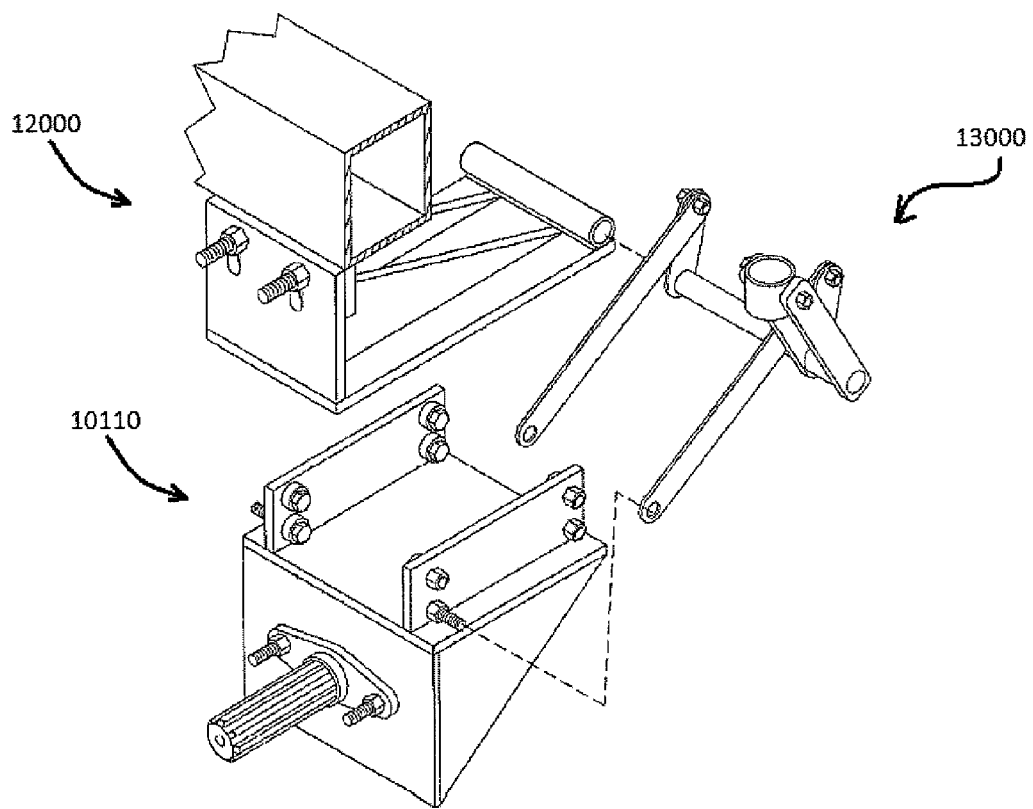
FIG. 13A is an exploded view of the first structure, the linkage, and the intermediate support structure in accordance with example embodiments.
Figure 13B:
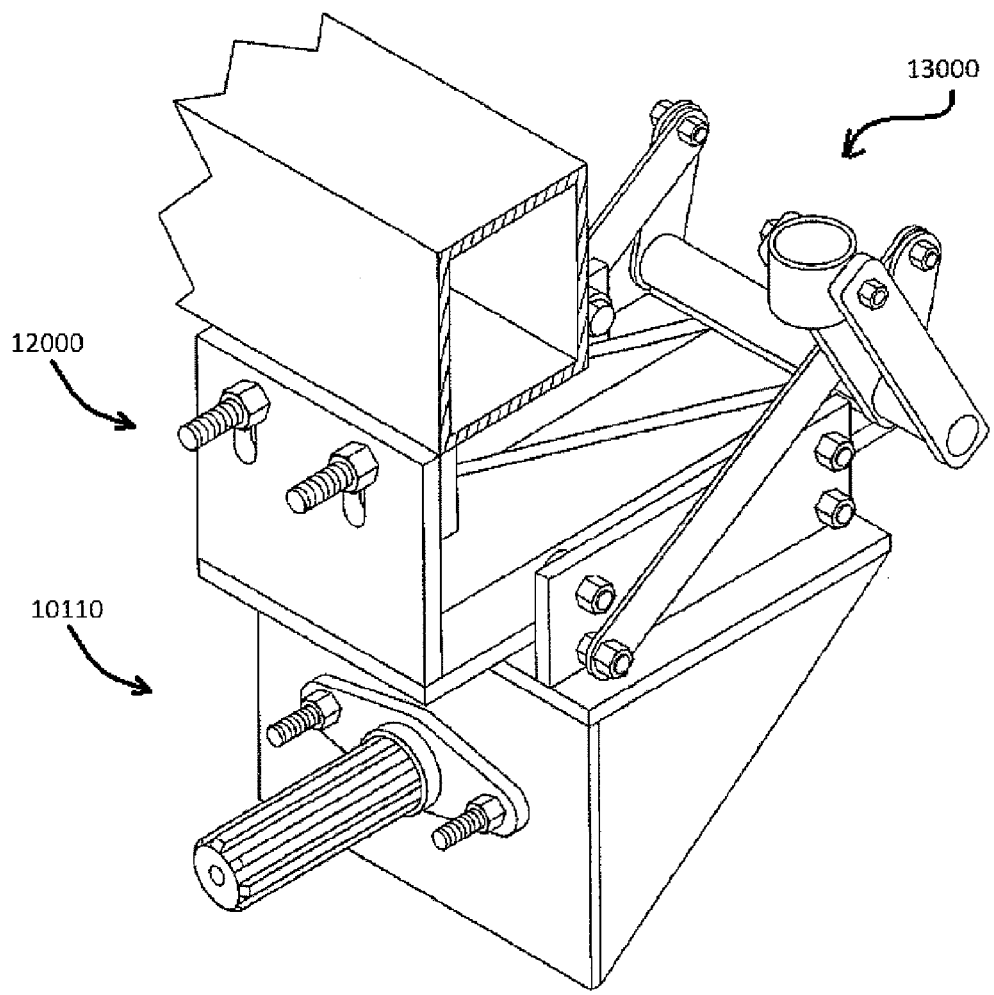
FIG. 13B is a view of the assembled first structure, linkage, and intermediate support structure in accordance with example embodiments.

FIG. 13A represents an exploded view of the intermediate support structure 12000, the linkage 13000, and the first structure 10110 and FIG. 13B illustrates the intermediate structure 12000, the linkage 13000, and the first structure 10110 in the assembled condition. FIG. 14A illustrates an example of the coupler with the moving device 10170 attached to the linkage 13000 via the collar 13100. In example embodiments, the moving device 10170 is pivotally connected to a connecting member 10174 by a collar. The connecting member 10174 in turn is rigidly connected to the cross member 10152. In FIG. 14A the moving member 10174 is illustrated as a piston cylinder type actuator in a retracted position. In FIG. 14B, the piston is extended which results in the linkage 13000 advancing the first structure 10110 in a first direction. The first structure 10110 may be moved in an opposite direction by moving the piston back to its original position.

Figure 15A:
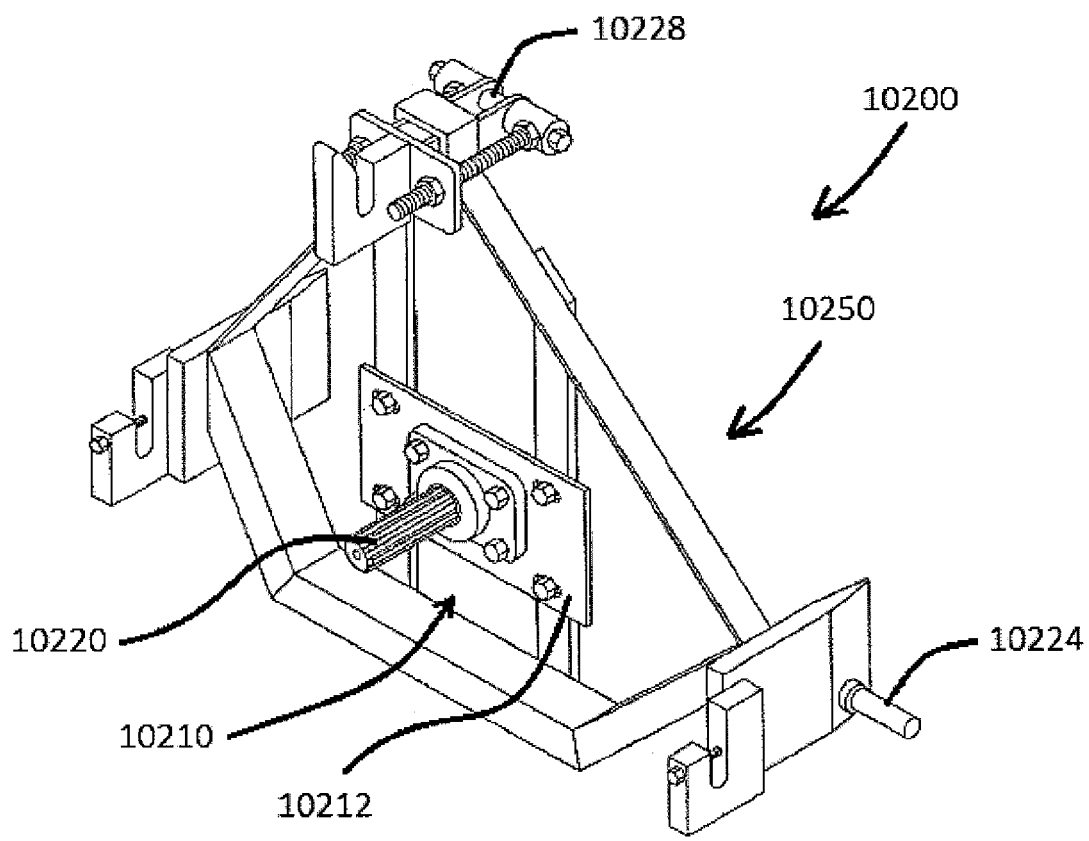
FIGS. 15A and 15B are views of a connector in accordance with example embodiments.
Figure 15B:
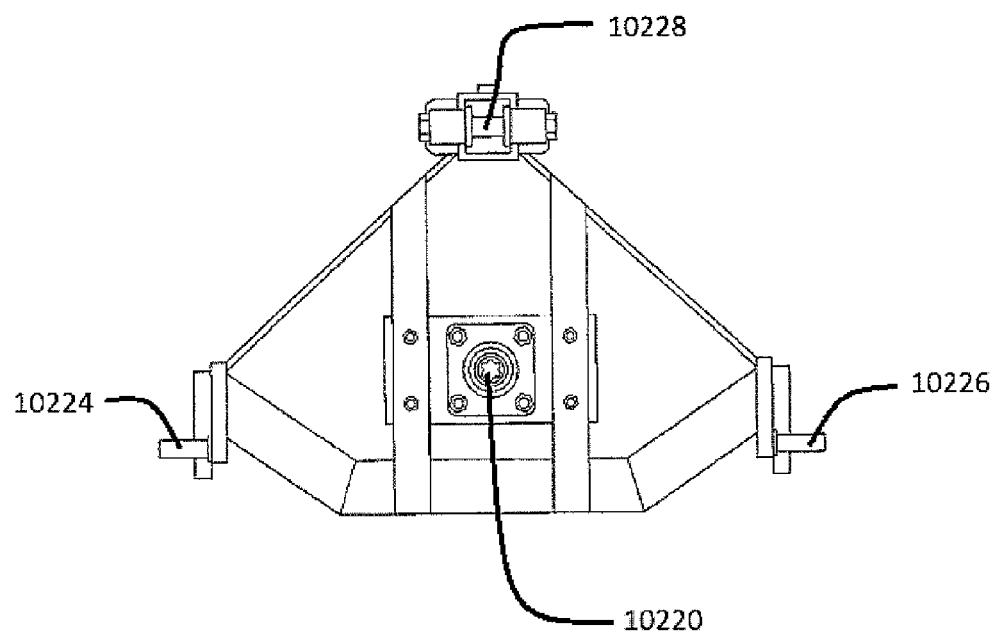

FIGS. 15A-15B are views of an attachment 10200 usable with example embodiments. As shown in FIGS. 15A-15D, the attachment 10200 may include a third structure 10210 configured to rotatably support a second shaft 10220. For example, the third structure 10210 may include a plate which includes a bearing 10212, for example, a ball bearing. The bearing 10212 may support the second shaft 10220 in a manner that allows the second shaft 10220 to rotate with respect to the third structure 10210.

In example embodiments, the second shaft 10220 may be a multidiameter shaft as shown in at least FIGS. 7A and 7B. As shown in FIGS. 7A and 7B, the second shaft 10220 may have a first portion 220A and a second portion 220B. The first portion portion 220A may enclose a space which may be substantially cylindrical. Thus, the first portion 220A may resemble a hollow cylinder or a substantially hollow cylinder. For example, the first portion 220A may resemble a hollow cylinder having an outer diameter D2 and an inner diameter D3. In example embodiments, an internal wall of the first portion 220A forming the space may have grooves configured to engage the splines of the shaft 10120. Thus, in example embodiments, the shaft 10120 may "plug into" the first portion 220A of the second shaft 10120 by inserting the splines of the shaft 10120 into the grooves of the first portion 220A. In example embodiments, the second portion 220B of the second shaft 10220 may resemble a substantially solid cylinder having an outer diameter D4. In example embodiments, the second portion 220B may have splines similar to the splines of the shaft 10120.

In example embodiments, the third structure 10210 may be connected to a fourth structure 10250. For example, a pair of plates may be used to connect the third structure 10210 to the fourth structure 10250. Example embodiments, however, are not limited thereto as different structures, for example, tube steel, W-shaped steel members, I-shaped steel members, H-shaped steel members, channel iron or other structural members may be used to attach the third structure 10210 to the fourth structure 10250.

As was previously described, the attachment 10200 may include the first complementary support member 10224, the second complementary support member 10226, and the third complementary support member 10228. In example embodiments, each of the first complementary support member 10224 and the second complementary support member 10226 may resemble a short cylinder or a bar and each may be configured to insert into an open space provided in the first support member 10160 and the second support member 10162. The third complementary support member 10228 may likewise resemble a short cylinder off set from the fourth structure 10250 by a pair of plates. In example embodiments, the third complementary support member 10228 may be configured to insert into an open space provided in the third support member 10164.

Figure 16A:
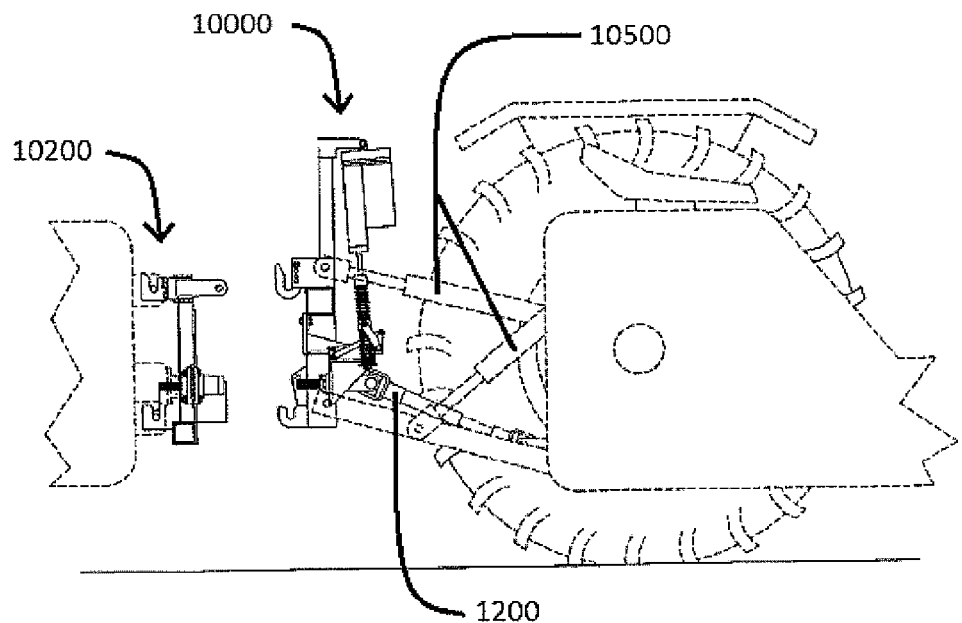
FIGS. 16A-16C are views of the coupler connecting to the connector in accordance with example embodiments.
Figure 16B:
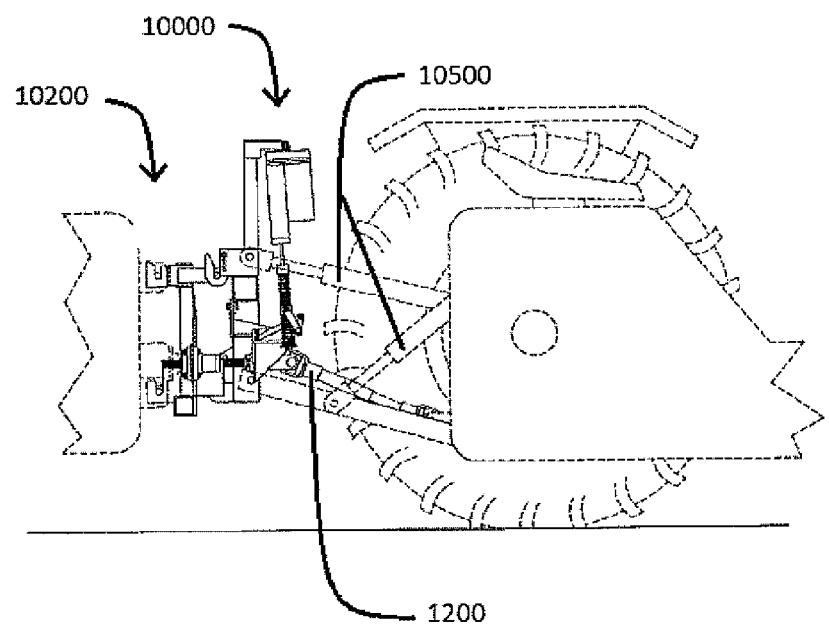
Figure 16C:
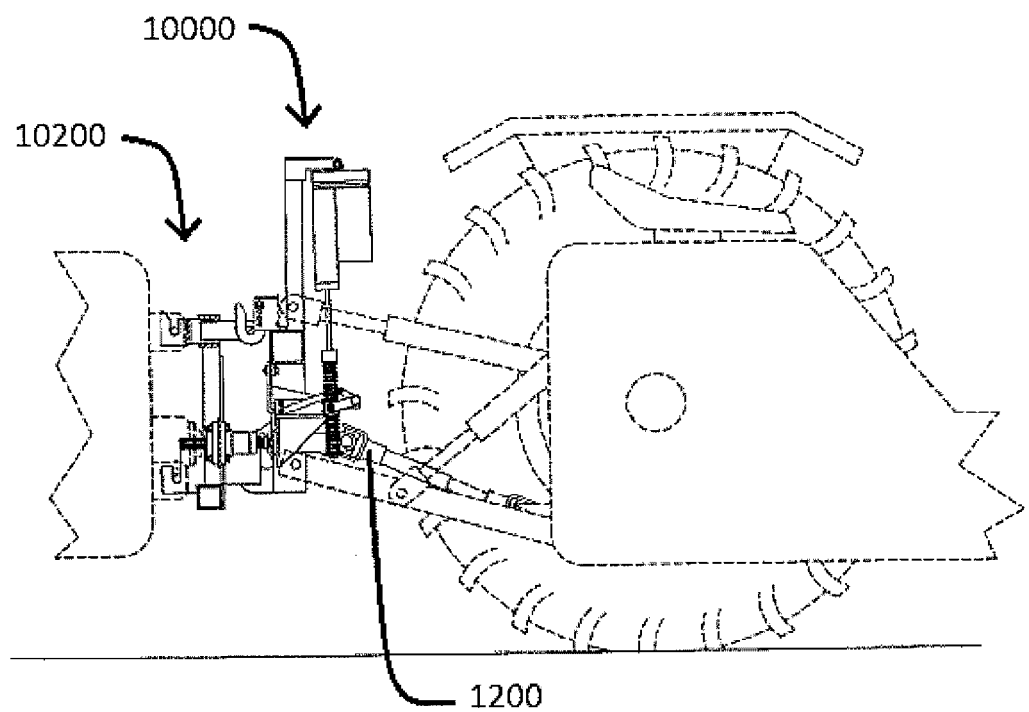

FIGS. 16A-16C illustrate an example of the coupler 10000 mounted on a vehicle, for example, a tractor or a truck, and the attachment 10200 mounted on a piece of equipment, for example, a pump or a mower. In example embodiments, the vehicle may include a power take off which is connected to the shaft 10120 by a connecting member 1200, for example, a telescoping universal joint. In example embodiments, the connecting member 1200 may transfer power from a shaft of the PTO to the shaft 10120 of the coupler 10000. For example, as a shaft of the power take off turns, the connecting member 1200 may turn causing the shaft 10120 to turn. In this manner the shaft 10120 is operatively connected to the power take off.

In example embodiments, a second moving device 10500 may be attached to the vehicle and to the coupler 10000 to move the coupler 10000 up and down. In example embodiments, the second moving device 10500 may be at least one an actuator, for example, a hydraulic or pneumatic cylinder or a screw jack connected to an electric motor.

In FIG. 16A the coupler 10000 is shown in a first position where the first, second, and third support members 160, 162, and 164 are at a lower elevation than that of the first, second, and third complementary support members 10224, 10226, and 10228. In example embodiments, the vehicle may be moved so that the first, second, and third support members 10160, 10162, and 10164 are below the first, second, and third complementary support members 10224, 10226, and 10228. In this position, the second moving device 10500 may be activated to move the coupler 10000 upwards so that the first, second, and third complementary support members 10224, 10226, and 10228 are in the open spaces formed in the first, second, and third support members 10160, 10162, and 10164 as shown in FIG. 16B. In this configuration the shaft 10120 of the coupler 10000 may be aligned with the shaft 10220 of the attachment 10200. In example embodiments, because the shaft 10120 of the coupler 10000 and the shaft 10220 of the attachment 10200 may be aligned, the moving device 10170 may be operated to insert the shaft 10120 into the shaft 10220 so that the splines associated with shaft 10120 are inserted into the grooves of the shaft 10220 as shown in FIG. 16C. Because the shaft 10120 is inserted into the shaft 10220, the shaft 10220 will turn as the shaft 10120 turns. Thus, because the shaft 10120 is operatively connected to the power take off, and because the shaft 10120 is inserted into the shaft 10220, the shaft 10220 will turn as the shaft of the power take off turns.

While example embodiments have been particularly shown and described with reference to example embodiments thereof, it will be understood by those of ordinary skill in the art that various changes in form and details may be made therein without departing from the spirit and scope of the invention.

What I claim is:

1. A coupler comprising:
   a first structure, the first structure including a first pair of rollers and a second pair of rollers;
   a first shaft rotatably supported by the first structure;
   a second structure supporting the first structure;
   an intermediate structure between the first structure and the second structure, the intermediate structure including a plate between rollers of the first pair of rollers and the second pair of rollers; and
   a moving device configured to move the first structure relative to the second structure, wherein the first pair of rollers and the second pair of rollers roll along the plate when the first structure is moved relative to the second structure.

2. The coupler according to claim 1, wherein the moving device is configured to substantially linearly translate the first structure with respect to the second structure.

3. The coupler according to claim 2, wherein the moving device includes an actuator.

4. The coupler according to claim 3, wherein the actuator is one of a pneumatic and a hydraulic actuator.

5. The coupler according to claim 2, wherein the moving device further includes a linkage attached to the actuator, the first structure, and the intermediate structure.

6. The coupler according to claim 1, wherein the coupler includes at least a first support member, a second support member, and a third support member.

7. The coupler according to claim 6, wherein at least one of the first support member, the second support member, and the third support member is a hook shaped member.

8. A system comprising:
   a power takeoff;
   a first structure, the first structure including a first pair of rollers and a second pair of rollers;
   a first shaft rotatably supported by the first structure;
   a second structure supporting the first structure;
   an intermediate structure between the first structure and the second structure, the intermediate structure including a plate between rollers of the first pair of rollers and the second pair of rollers;
   a connector connecting the power takeoff to the first shaft; and
   a moving device configured to move the first structure relative to the second structure, wherein the first pair of rollers and the second pair of rollers roll along the plate when the first structure is moved relative to the second structure.

9. The system according to claim 8, wherein the moving device is configured to substantially linearly translate the first structure with respect to the second structure.

10. The system according to claim 9, wherein the moving device includes an actuator.

11. The system according to claim 10, wherein the actuator is one of a pneumatic and a hydraulic actuator.

12. The system according to claim 9, wherein the moving device further includes a linkage attached to the actuator, the first structure, and the intermediate structure.

13. The system according to claim 8, wherein the second structure includes at least a first support member, a second support member, and a third support member.

14. The system according to claim 13, wherein at least one of the first support member, the second support member, and the third support member is a hook shaped member.

15. The system according to claim 8, further comprising:
   a third structure supporting a second shaft, wherein the moving device is configured to at least one of move the first shaft into the second shaft and move the first shaft out of the second shaft; and
   an actuator configured to move the first structure and second structure relative to the third structure.

16. The system according to claim 15, wherein the moving device is configured to substantially linearly translate the first structure with respect to the second structure when the first shaft is moved into or out of the second shaft.

17. The system according to claim 15, wherein the second shaft is connected to a machine and the second shaft provides power to the machine.

18. The system according to claim 8, wherein the power takeoff is associated with a vehicle.

19. The system according to claim 18, wherein the vehicle is a tractor.

20. A coupler comprising:
a first structure;
a second structure, the second structure including a bearing configured to support a shaft, the second structure further including at least one pair of rollers;
an intermediate structure between the first structure and the second structure, the intermediate structure including a plate sandwiched between the at least one pair of rollers so that the at least one pair of rollers may roll on the plate, the intermediate structure further including a capture member; and
a linkage, the linkage including an axle captured by the capture member, a collar configured to connect to an actuator, a first link connecting the collar to the axle, and a second link connecting the axle to the first support member, wherein when the axle rotates the at least one pair of rollers rolls along the plate of the intermediate support member.

* * * * *